United States Patent
Westby

(10) Patent No.: US 6,502,189 B1
(45) Date of Patent: Dec. 31, 2002

(54) METHOD AND DEDICATED FRAME BUFFER FOR LOOP INITIALIZATION AND RESPONSES

(75) Inventor: Judy Lynn Westby, Bloomington, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/193,387

(22) Filed: Nov. 17, 1998

Related U.S. Application Data

(60) Provisional application No. 60/065,920, filed on Nov. 17, 1997, provisional application No. 60/065,926, filed on Nov. 17, 1997, provisional application No. 60/065,919, filed on Nov. 17, 1997, and provisional application No. 60/067,211, filed on Dec. 1, 1997.

(51) Int. Cl.[7] .................................................. G06F 3/00
(52) U.S. Cl. .................................. 713/1; 710/8; 710/52
(58) Field of Search ................................. 710/8, 11, 20, 710/52, 126, 128, 130; 713/1

(56) References Cited

U.S. PATENT DOCUMENTS

| | | | |
|---|---|---|---|
| 4,486,739 A | 12/1984 | Franaszek et al. | 340/347 |
| 4,933,785 A | 6/1990 | Morehouse et al. | 360/78.04 |
| 5,034,837 A | 7/1991 | Schmitz | 360/105 |
| 5,172,538 A | 12/1992 | Luger | 54/47 |
| 5,235,482 A | 8/1993 | Schmitz | 360/97.02 |
| 5,260,933 A | 11/1993 | Rouse | 370/14 |
| 5,341,260 A | 8/1994 | Jabbari | 360/105 |
| 5,455,723 A | 10/1995 | Boutaghou et al. | 360/75 |
| 5,535,035 A | 7/1996 | DeFoster et al. | 359/161 |
| 5,590,006 A | 12/1996 | Shafe | 360/105 |
| 5,598,541 A | 1/1997 | Malladi | 395/286 |
| 5,617,425 A | 4/1997 | Anderson | 371/10.2 |
| 5,619,497 A | 4/1997 | Gallagher et al. | 370/394 |
| 5,638,518 A | 6/1997 | Malladi | 395/200.21 |
| 5,663,724 A | 9/1997 | Westby | 341/59 |
| 5,663,846 A | 9/1997 | Masuoka et al. | 360/75 |

(List continued on next page.)

FOREIGN PATENT DOCUMENTS

| | | | | |
|---|---|---|---|---|
| JP | 5-166322 | 7/1993 | | G11B/21/22 |
| JP | 5-225732 | 9/1993 | | G11B/21/12 |
| JP | 10-302421 | 11/1998 | | G11B/21/12 |

OTHER PUBLICATIONS

"Fibre Channel Arbitrated Loop (FC–AL), REV 4.5", American National Standard for Information Technology draft proposed, ANSI X3.272–199 X, (Jun. 1, 1995).

(List continued on next page.)

Primary Examiner—Thomas M. Heckler
(74) Attorney, Agent, or Firm—Kirk A. Cesari; Derek J. Berger

(57) ABSTRACT

A fiber-channel loop interface circuit that includes a dedicated transmit-frame buffer for loop initialization and responses ("responses" are non-data frames sent in response to commands or inquiries from other nodes). Having a dedicated transmit-frame buffer allows one port of a dual-port node to be transmitting initialization or response frames while another port is transmitting data frames, response frames, or initialization frames. Either or both ports can also be simultaneously receiving frames. The system includes a channel node having dual ports, each supporting a fiber-channel arbitrated-loop serial communications channel, and dedicated frame buffers within the channel node for loop initialization and responses. In some embodiments, the dedicated frame buffers are configured as on-chip buffers and include: two inbound non-data buffers coupled to the two ports, a data-frame buffer coupled to both ports, and an outbound transmit-frame buffer coupled to at least one of the ports. In addition, a method for loop initialization and responses using the dedicated buffer is described.

26 Claims, 15 Drawing Sheets

U.S. PATENT DOCUMENTS

| | | | | |
|---|---|---|---|---|
| 5,694,615 | A | 12/1997 | Thapar et al. | 395/822 |
| 5,701,219 | A | 12/1997 | Shafe | 360/105 |
| 5,758,081 | A | 5/1998 | Aytac | 395/200.41 |
| 5,761,534 | A | 6/1998 | Lundberg et al. | 395/870 |
| 5,761,705 | A | 6/1998 | DeKoning et al. | 711/113 |
| 5,764,931 | A | 6/1998 | Schmahl et al. | 395/287 |
| 5,764,972 | A | 6/1998 | Crouse et al. | 395/601 |
| 5,768,530 | A | 6/1998 | Sandorfi | 395/200.63 |
| 5,768,623 | A | 6/1998 | Judd et al. | 395/857 |
| 5,778,426 | A | 7/1998 | DeKoning et al. | 711/122 |
| 5,781,801 | A | 7/1998 | Flanagan et al. | 395/876 |
| 5,787,242 | A | 7/1998 | DeKoning et al. | 395/182.03 |
| 5,787,450 | A | 7/1998 | Diedrich et al. | 707/513 |
| 5,790,773 | A | 8/1998 | DeKoning et al. | 395/182.04 |
| 5,790,792 | A | 8/1998 | Dudgeon et al. | 395/200.42 |
| 5,802,080 | A | 9/1998 | Westby | 371/53 |
| 5,805,788 | A | 9/1998 | Johnson | 395/182.04 |
| 5,805,920 | A | 9/1998 | Sprenkle et al. | 395/821 |
| 5,807,261 | A | 9/1998 | Benaron et al. | 600/473 |
| 5,809,328 | A | 9/1998 | Nogales et al. | 395/825 |
| 5,812,564 | A | 9/1998 | Bonke et al. | 371/40.1 |
| 5,812,754 | A | 9/1998 | Lui et al. | 395/182.04 |
| 5,815,662 | A | 9/1998 | Ong | 395/200.47 |
| 5,819,054 | A | 10/1998 | Ninomiya et al. | 395/308 |
| 5,822,143 | A | 10/1998 | Cloke et al. | 360/65 |
| 5,822,782 | A | 10/1998 | Humlicek et al. | 711/170 |
| 5,825,576 | A | 10/1998 | Kamerbeck | 360/75 |
| 5,828,522 | A | 10/1998 | Brown et al. | 360/105 |
| 5,831,795 | A | 11/1998 | Ma et al. | 360/105 |
| 5,864,448 | A | 1/1999 | Berberich | 360/105 |
| 5,875,074 | A | 2/1999 | Ho et al. | 360/105 |
| 6,243,386 | B1 * | 2/2001 | Chan et al. | 370/403 |
| 6,304,910 | B1 * | 10/2001 | Roach et al. | 709/236 |

OTHER PUBLICATIONS

"Fibre Channel, Arbitrated Loop (FC–AL–2), REV 6.3", American National Standard for Information Technology draft proposed, ANSI X3.xxx–199x, (May 29, 1998).

"Fibre Channel, Physical and Signaling Interface (FC–PH), Rev 4.3", American National Standard for Informations Systems working draft, ANSI X3.230–199x, (Jun. 1, 1994).

"Information Systems—dpANS Fibre Channel Protocol for SCSI", American National Standard—draft proposed, X3.269–199x revision 12, (Dec. 4, 1995).

Georgiou, C.J., et al., "Scalable Protocol Engine for High–Bandwidth Communications", *IEEE*, pp. 1121–1126, (1997).

* cited by examiner

METHOD AND DEDICATED FRAME BUFFER FOR LOOP INITIALIZATION AND RESPONSES

RELATED APPLICATIONS

This application claims the benefit under 35 U.S.C. 119(e) of U.S. Provisional Application Ser. No. 60/065,920 filed Nov. 17, 1997, U.S. Provisional Application Ser. No. 60/065,926 filed Nov. 17, 1997, U.S. Provisional Application Ser. No. 60/065,919 filed Nov. 17, 1997, and U.S. Provisional Application Ser. No. 60/067,211 filed Dec. 1, 1997.

This application is related to the following applications filed on even date herewith, each of which is incorporated by reference: Method and Dedicated Frame Buffers for Receiving Frames, application Ser. No. 09/193,681, filed on Nov. 17, 1998, Method and Apparatus for Using CRC for Data Integrity in On-Chip Memory, application Ser. No. 09/193,446, filed on Nov. 17, 1998, and Method and Apparatus to Reduce Arbitrated-Loop Overhead, filed on Nov. 17, 1998.

FIELD OF THE INVENTION

The present invention relates to the field of mass-storage devices. More particularly, this invention relates to an improved fibre-channel arbitrated-loop ("FC-AL") apparatus and method having a dedicated frame buffer for loop initialization and responses.

BACKGROUND OF THE INVENTION

One key component of any computer system is a device to store data. Computer systems have many different devices where data can be stored. One common place for storing massive amounts of data in a computer system is on a disc drive. The most basic parts of a disc drive are a disc that is rotated, an actuator that moves a transducer to various locations over the disc, and circuitry that is used to write and read data to and from the disc. The disc drive also includes circuitry for encoding data so that it can be successfully retrieved from and written to the disc surface. A microprocessor controls most of the operations of the disc drive, in addition to passing the data back to the requesting computer and taking data from a requesting computer for storing to the disc.

The interface for transferring data between the disc drive and the rest of the computer system is typically a bus or channel, such as the Small Computer Systems Interface ("SCSI"), or the Fiber Channel. Certain aspects of such interfaces are often standardized in order that various devices from different manufacturers can be interchanged and all can be connected to a common interface. Such standards are typically specified by some standards committee of an organization such as the American National Standards Institute ("ANSI").

One standardized interface for exchanging data between various storage devices and various computers is the fibre channel. In some embodiments, the fibre-channel standard includes arbitrated loops (described further below). In some embodiments, the fibre-channel standard supports a SCSI-like protocol for controlling data transfers.

Fiber channels represent significant advantages over Small Computer Standard Interface ("SCSI") designs. Fiber channels provide significantly higher bandwidths, currently up to about 106 megabytes per second, compared to between two and twenty megabytes per second for traditional SCSI designs. Fiber channels provide greater connectivity in that up to one-hundred twenty-six devices (including the host) may be connected, as compared to a maximum of seven or fifteen devices in typical SCSI environments. The fibre channel can be attached with a single connector and does not require a switch. A fibre channel using coaxial electrical conductors operates at distances of up to thirty meters between devices, and up to ten kilometers using fibre optics for an entire channel, as compared to a maximum total length of up to twenty-five meters for SCSI environments. In SCSI environments, errors in data transmission are detected through use of parity, whereas in fibre channels, errors are identified by a running disparity and cyclic-redundancy-code check ("CRC check") information. More information can be found in U.S. Pat. No. 5,802,080 entitled "CRC Checking Using a CRC Generator in a Multi-port Design," and U.S. Pat. No. 5,663,724 entitled "16B/20B Encoder," both by the present inventor, Westby, and commonly assigned to the present assignee Seagate Technology, Inc., each of which is incorporated by reference.

The fibre-channel arbitrated loop ("FC-AL") is an industry-standard system employing a byte-oriented DC-balanced (0,4) run-length-limited 8B/10B-partitioned block-transmission code scheme. The FC-AL operates at a clock frequency of 106.25 MHZ. One form of an 8B/10B encoder/decoder is described in U.S. Pat. No. 4,486,739 granted Dec. 4, 1984 for "Byte Oriented DC Balanced (0,4) 8B/10B Partitioned Block Transmission Code" by Franaszek et al., which is incorporated by reference.

A fibre-channel arbitrated loop ("FC-AL") allows for multiple devices, each called "a node," to be connected together. A node may be any device (a computer, workstation, printer, disc drive, scanner, etc.) of the computer system having an interface allowing it to be connected to a fibre-channel "topology" (defined just below). Each node has at least one port, called an NL port ("node-loop port") to provide access to other nodes. The components that connect two or more ports together are collectively called a "topology" or a "loop." Each node communicates with all other nodes within the provided topology or loop.

Ports are the connections in a fibre-channel node, though which data may pass over the fibre channel to ports of other nodes (the outside world). A typical fibre-channel drive has two ports packaged within the drive's node. Each port includes a pair of "fibres"—one to carry information into the port and one to carry information out of the port. Each "fibre" is a serial data connection, and, in one embodiment, each fibre is actually a coaxial wire (e.g., coaxial copper conductors, used when the nodes are in close proximity to one another); in other embodiments, a fibre is implemented as an optical fibre for at least some of its path (e.g., when nodes are separated by an appreciable distance, such as nodes in different cabinets or, especially, different buildings). The pair of fibres connected to each port (one carrying data into the port, the other carrying data out from the port) is called a "link" and is part of each topology. Links carry information or signals packaged in "frames" between nodes. Each link can handle multiple types of frames (e.g., initialization, data, and control frames).

Since each fibre carries data in one direction only, nodes are connected to one another along a loop, wherein the nodes must arbitrate for control of the loop when they have data to transfer. "Arbitration" is the process of coordinating the nodes to determine which one has control of the loop. Fiber-channel arbitrated loops attach multiple nodes in the loop without hubs or switches. The node ports use arbitration operations to establish a point-to-point data-transfer circuit. FC-AL is a distributed topology where each port includes at least the minimum necessary function to establish the circuit. The arbitrated-loop topology is used to connect any number of nodes between two and one-hundred twenty-six (126) node ports.

In some embodiments, each node includes dual ports (each connected to a separate loop) which provide redundancy, so that if one loop fails, the other one can fulfill the loop duties. Dual ports also allow two hosts (e.g., two host computers) to share a single drive.

In typical first- and second-generation FC-AL drives, the two ports shared the frame-validation and frame-generation logic. This meant that if one port was receiving or transmitting a frame, the alternate port was effectively busy (since it could not simultaneously use the frame-validation and frame-generation logic), and the alternate port was thus forced to deny its host-bus adapter permission to send frames. Some host-bus adapters would continuously have to arbitrate and attempt to send a frame over and over until the primary port closed. Also, the drive was only able to transmit on one port at a time. In some cases, an outbound data transfer on a given port would have to be paused in order to send a response or perform loop initialization on the other (alternate) port.

CRC Background

Most data-transmission operations employ error checking by which an error code, based on the header and payload data of the transmission, is checked to verify the integrity of the received header and payload data. One such error-checking scheme employs cyclic-redundancy-code ("CRC") information. A typical circuit employing CRC error checking will include a CRC checker to verify the integrity of received data words and a CRC generator to generate CRC information for digital words being transmitted. In multi-port designs, a CRC checker and a CRC generator must be available for each port to handle verification of each received digital word and to generate CRC information for each digital word being transmitted. In many applications, the circuit or loop-interface module transmits on only one port at a time. For example, a disc-drive subsystem communicating through a multi-port interface module to a computer network would prepare and transmit data through only a single port at any given time. However, the loop-interface module might attempt to receive data through plural ports at a given time.

One approach to reception of data through plural ports is to simply inhibit reception of data through other ports when one port is already receiving data. This approach allows common resources, such as the CRC checker or the frame-validation logic, to be shared among the several ports. The first port to receive data seizes use of the common resources to the exclusion of the other ports, and the other ports are inhibited from receiving data. Hence, incoming data cannot be received on the other ports and the other ports are limited to the function of data transmission. This approach resulted in the other ports receiving a "busy" condition in response to requests to transmit data, and necessitated repeating the sequence to request transmission of data again and again, until the first port completed the operation it was performing and freed-up the common resource.

Loop Initialization Background

In plural loop networks, it is necessary to "initialize" a loop after an error condition is detected, as well as when a loop-interface module is connected into the channel, or when the fibre channel is powered up. Initialization is ordinarily accomplished by transmitting loop-initialization data onto the loop. However, if a loop-interface module connected to the loop is already receiving data through a port connected to another loop, that loop-interface module might not be able to receive the loop-initialization data. Normally, under such circumstances the data transfer is suspended, and loop initialization is allowed to proceed first. In other instances, the loop-initialization sequence will stall, and go into a continuous-retry mode until the other loop (of the dual-loop node) completes receiving data. Moreover, if the loop-interface modules can receive only on one loop at a time, the modules cannot receive data through another port while loop initialization is occurring on one channel.

Fiber links have received considerable attention in connection with transmission of data between various devices of a computer network. More particularly, fibre channels offer significant advantages over Small Computer System Interface ("SCSI") buses in terms of higher bandwidth, greater connectability, greater ease of attachment of modules, greater transmission distance, and other factors. For example, a typical SCSI bus is able to handle up to fifteen (15) modules with a total distance of up to about 25 meters, whereas a fibre channel can handle up to one-hundred twenty-six (126) modules with a distance of about thirty meters between modules using electrical transmission, or up to ten kilometers using optical transmission. Thus, in order to achieve a data-transfer rate of, for example, a terrabyte/second peak, it would require up to seventy SCSI buses but would need only about ten fibre channels.

It is important that a channel be brought up to operation (i.e., "initialized") as early as possible to reduce the load of data traffic that would otherwise be imposed on other channels.

There is, therefore, a need for an arrangement to permit multi-port loop-interface modules to receive data and non-data frames on plural channels simultaneously, or to transmit frames on one channel while receiving data on another, or to transmit initialization and response frames on plural channels simultaneously. There is also a need for better and increased data-checking capability for data stored in on-chip buffers.

SUMMARY OF THE INVENTION

A method and dedicated frame buffer for loop initialization and responses. A fibre-channel loop interface circuit is described that includes a dedicated transmit-frame buffer for loop initialization and responses ("responses" are non-data frames sent in response to commands or inquiries from other nodes). Having such a dedicated transmit-frame buffer allows one port of a dual-port node to be transmitting initialization or response frames while another port is transmitting data frames, response frames, or initialization frames; and, in one embodiment, either or both ports can also be simultaneously receiving frames.

The present invention provides an improved communications channel system that includes a first channel node having dual ports, each port supporting a fibre-channel arbitrated-loop serial communications channel, and a dedicated frame buffer (which includes one or more specialized component frame buffers) within the first channel node for loop initialization and responses. In some embodiments, the dedicated frame buffer is configured as an on-chip buffer and includes: a first inbound non-data buffer coupled to a first port, a second inbound non-data buffer coupled to a second port, a data-frame buffer coupled to both the first port and the second port, and an outbound transmit-frame buffer coupled to at least one of the first and second ports.

Optionally, the system further includes a loop-initialization circuit that performs loop initialization substantially simultaneously on both the first port and the second port using data in the transmit-frame buffer. In some embodiments, the dedicated frame buffer includes a transmit-frame buffer having about eighty words (wherein, in this case, each "word" is thirty-six bits wide—thirty-two data bits and four parity bits). In another embodiment, the dedicated frame buffer includes a transmit-frame buffer coupled to at least one of the first and second ports for loop initialization and responses.

In some embodiments of the system, the transmit-frame buffer transmits loop initialization or responses on a first port, while substantially simultaneously a second port transmits data. In one such embodiment, the system further includes a loop-initialization circuit that performs loop initialization substantially simultaneously on both the first port and the second port using data in the transmit-frame buffer.

In some embodiments of the system, the dedicated frame buffer is configured as an on-chip buffer and includes a dedicated transmit-frame buffer coupled to at least one of the first and second ports for loop initialization and responses. In one such embodiment, the dedicated transmit-frame buffer is coupled to both ports and reserves about half of the buffer's space for a first port and another half of the buffer's space for a second port and the system further includes a loop-initialization circuit that performs loop initialization substantially simultaneously on both the first port and the second port using data in the transmit-frame buffer. Optionally, any of these embodiments of the system further includes a magnetic-disc-storage drive coupled to the first node, and a computer system connected to a second node (or, equivalently, a computer system having a second node), wherein the second node is coupled to the first node in a communications channel in order to transfer data between the first and second nodes. Another aspect of the present invention provides a method that includes supporting a fibre-channel arbitrated-loop serial communications channel on each of two ports of a first channel node, and receiving frames in to, and transmitting frames out from, a dedicated frame buffer located in the first channel node.

In some embodiments of the method, the dedicated frame buffer includes a first inbound non-data buffer coupled to a first port, a second inbound non-data buffer coupled to a second port, a data-frame buffer coupled to both the first port and the second port, and a dedicated transmit-frame buffer. Some versions of the method provide performing loop initialization substantially simultaneously on both the first port and the second port using data in the dedicated transmit-frame buffer. Optionally, the dedicated frame buffer includes a transmit-frame buffer having about eighty words each being thirty-six bits wide (thirty-two data bits and four parity bits). Some embodiments provide for transmitting frames from the dedicated frame buffer that includes transmitting loop-initialization and response frames from a dedicated transmit-frame buffer coupled to at least one of the first and second ports for loop initialization and responses.

Other embodiments of the method also provide for receiving data substantially simultaneously on the second port while transmitting data on the first port.

In some embodiments of the method, the dedicated frame buffer is configured as an on-chip buffer and includes a dedicated transmit-frame buffer coupled to at least one of the first and second ports for loop initialization and responses. In one such embodiment, the dedicated transmit-frame buffer is coupled to both ports and reserves about half of the buffer's space for a first port and another half of the buffer's space for a second port and the method further includes performing loop initialization substantially simultaneously on both the first port and the second port using data in the transmit-frame buffer. In another such embodiment, the method further includes transferring data between a magnetic-disc-storage drive coupled to the first node and a computer system coupled to a second node (or, equivalently, a computer system having a second node), wherein the second node is coupled to the first node in a communications channel in order to transfer data between the first and second nodes.

Thus, the present invention provides a significant performance enhancement by allowing transmission of loop-initialization frames and/or response frames from a dedicated transmit buffer that is operable to transmit on either or both outbound fibres of a dual-port fibre-channel interface node. In some embodiments, such transmission is performed even while the node is simultaneously receiving a data frame on one of the inbound fibres and/or receiving a non-data frame on one or both of the inbound fibres. That is, transmitting on one fibre of a port is optionally performed simultaneously with receiving on the other fibre of the same port.

DETAILED DESCRIPTION

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

The invention described in this application is useful for all types of disc drives, including hard-disc drives, ZIP drives, floppy-disc drives, optical-disc drives, CDROM ("compact-disc read-only memory") drives, and any other type of drives, systems of drives (such as a "redundant array of inexpensive/independent disc drives," or RAID, configuration) or other devices, where data are communicated between drives and other devices or information-handling systems. In some embodiments, the present invention is useful in node interfaces for non-disc devices, such as hubs and switches (such as are used to connect plural fibre-channel loops to one another), workstations, printers, and other devices or information-handling systems that are connected on a fibre-channel arbitrated loop.

Below are four interrelated sections which describe the present invention: I. Dedicated Frame Buffer for Loop Initialization and Responses; II. Dedicated Frame Buffers for Receiving Frames; III. Using Fiber-Channel CRC for Data Integrity in On-Chip Memory; and IV. Method and Apparatus to Reduce Arbitrated-Loop Overhead. Section IV is the section primarily related to the details of the present invention, however, the other sections provide relevant information as to the overall environment for the invention.

Figure 1:
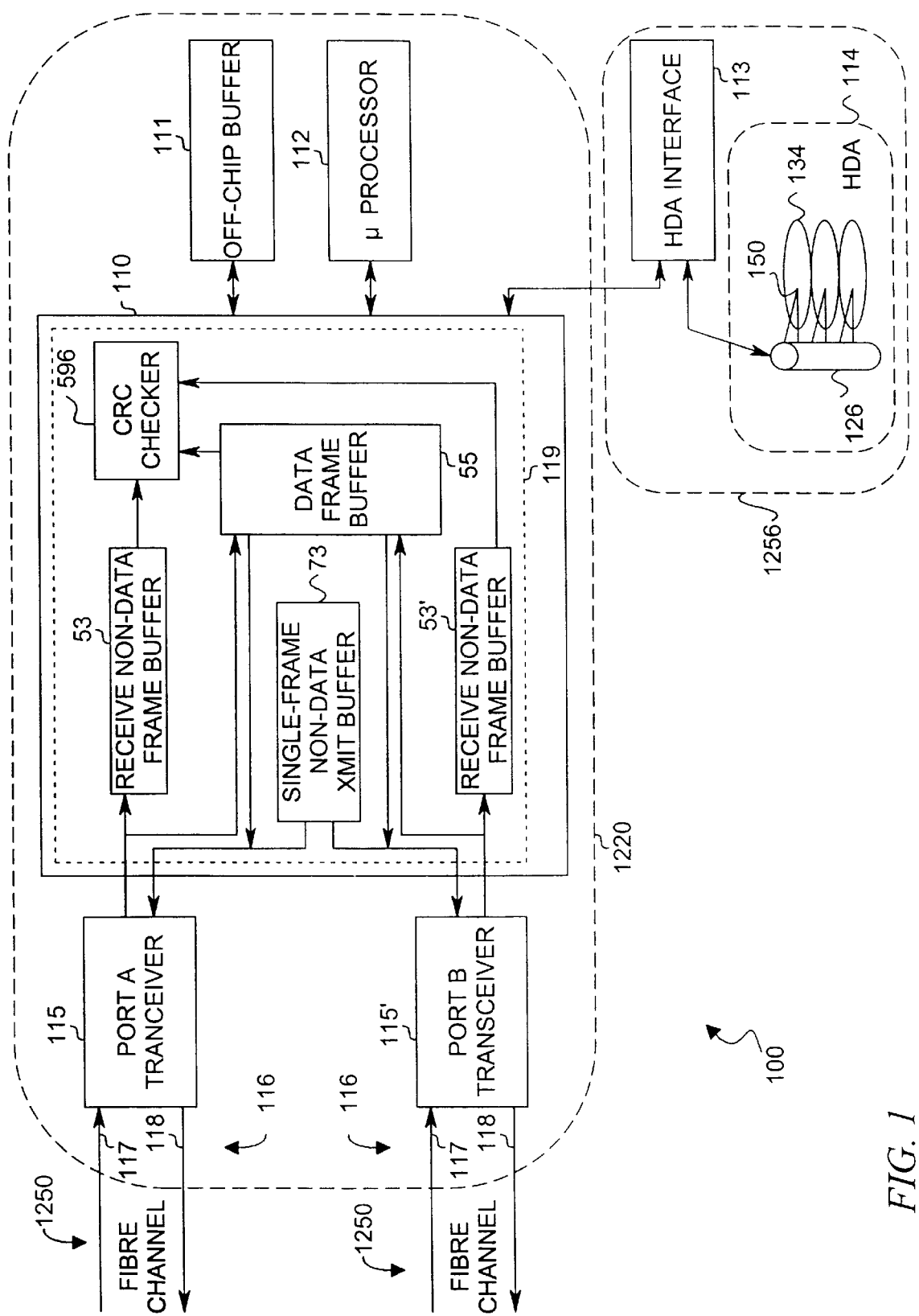
FIG. 1 is a block diagram of a disc drive 100 with a fibre-channel node interface.

FIG. 1 shows a block diagram of a disc-drive device 100 with a fibre-channel node interface.

Figure 2:
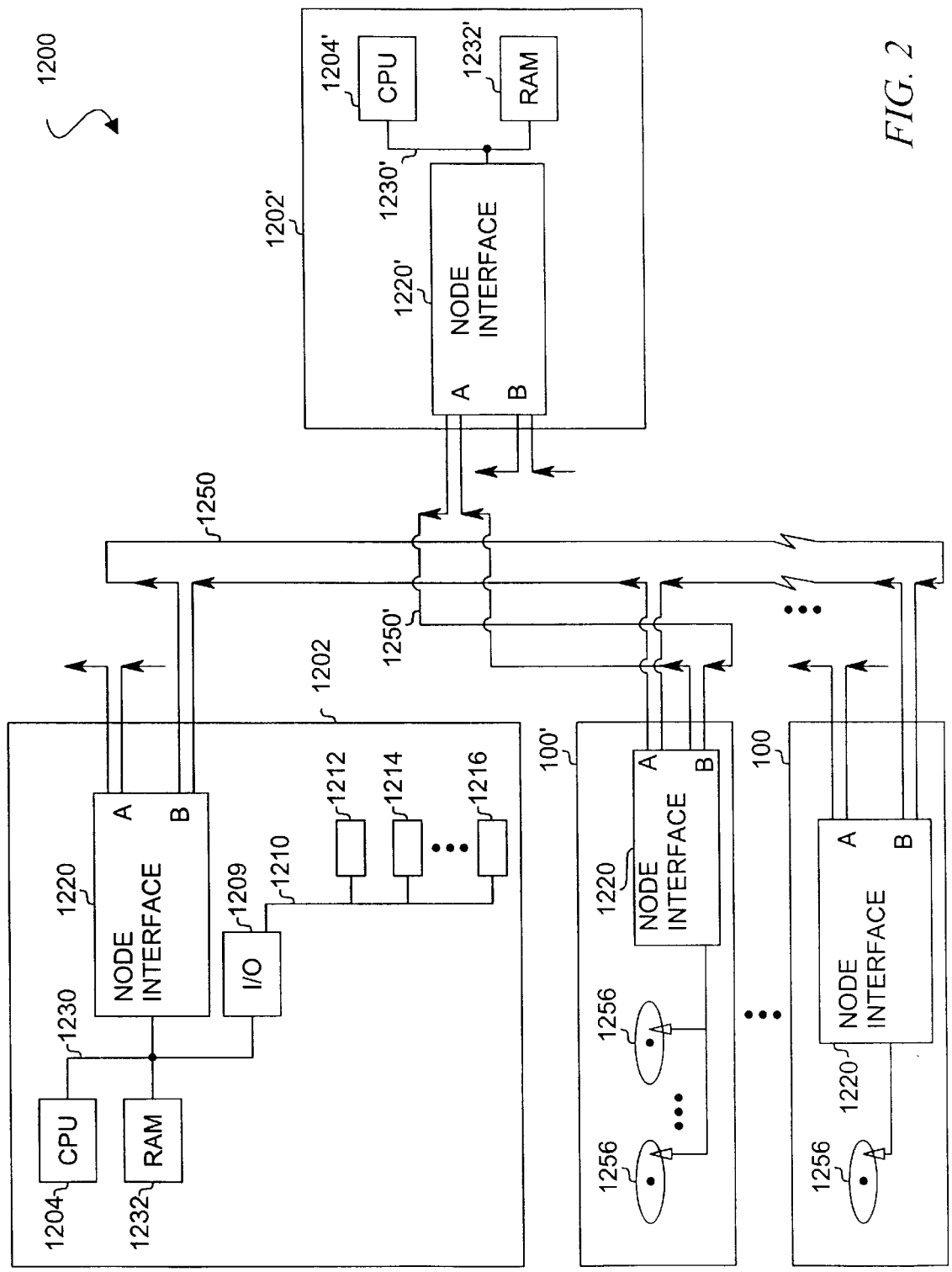
FIG. 2 is a block diagram of an information-handling system 1200 incorporating the present invention.

Referring to FIG. 2 as well as FIG. 1, a fibre-channel loop-interface circuit 1220 includes a dedicated transmit-frame buffer 73 for loop initialization and responses. ("Loop initialization" is accomplished by transmitting a sequence of one or more specialized non-data frames (and monitoring responses to those frames) to initialize a fibre-channel loop. "Responses" are non-data frames sent in response to commands or inquiries from other nodes.) The fibre-channel arbitrated-loop communications channel 1250 (also called a loop 1250, or fibre-channel loop 1250) can be used to communicate data between disc-storage devices 100 and computers 1202 or other information-handling devices. In one embodiment, fibre-channel loop 1250 is a serial communications channel; in other embodiments two or more parallel lines (or "fibres") are used to implement fibre-channel loop 1250. Having such a dedicated transmit-frame buffer 73 allows one port 116 of a dual-port node 1220 to be transmitting initialization or response frames while another port is transmitting or receiving data frames. The ports 116 are serial lines, one line 117 for inbound data, and another line 118 for outbound data, both lines 117 and 118 connecting to, and forming part of, communications channel loop 1250. Dedicated receive buffers (53, 53' and 55) are also provided for each port 116 of a two-port node. (Note that each block having a reference numeral with a prime (e.g., 53') provides the same function as the corresponding block without the prime (e.g., 53), but is used for a separate loop port or communications channel.) Cyclic-redundancy-code information received from the fibre channel 1250 along with a frame is stored in one of one or more frame buffers (53, 53' or 55), and later checked to ensure the integrity of the data while in the frame buffer (53, 53' or 55). Control of a loop 1250 is maintained (i.e., the loop connection is held open) as long as a programmable amount of data is available for transmission, in order to reduce the overall amount of time spent arbitrating for control of the loop 1250.

In some embodiments, disc drive 100 includes a magnetic-storage head-disc assembly ("HDA") 114 having one or more disc platters 134, one or more magnetic read/write transducers 150 per disc platter, and an arm actuator assembly 126. Signals between the transducers (or "heads") and HDA interface 113 transfer data to and from the disc platters 134. Thus, the "disc drive" of some embodiments (e.g., disc drive 1256 of FIG. 1) includes HDA 114 and HDA interface 113 (e.g., a conventional SCSI drive), and one or more such conventional disc drives 1256 is connected to an external node interface 1220 in order to connect to a loop or fibre-channel topology, as shown in FIG. 1. In other embodiments, a "disc drive" is typified by the disc drive 100 of FIG. 2, and includes a node interface 1220 integrated with the disc drive 1256 in overall disc drive 100. In one embodiment, data are in turn transferred from and to off-chip buffer 111. The invention provides a dedicated on-chip buffer 119, which, in the embodiment shown, includes a receive-non-data-frame buffer 53 (alternately called an "inbound non-data buffer 53") for each port (i.e., buffers 53 and 53'), a transmit-frame buffer 73 which, in one embodiment, can be used simultaneously by both ports (in other embodiments, a single buffer is used by only one port at a time), and a shared data-frame buffer 55, along with a CRC checker 596 (see FIG. 11). In one embodiment described more fully below, forty words of transmit-frame buffer 73 are reserved for Port A and forty words are reserved for Port B, so both ports can be initialized at the same time. Such an embodiment is equivalent to having two separate forty-word transmit-frame buffers, one for each port, which can be used simultaneously. In one such embodiment, each of these "words" is thirty-six bits wide (thirty-two data bits and four parity bits).

The CRC validity-checking information that is received with data frames from the fibre-channel loops 1250 is stored with the data in data-frame buffer 55, and then checked when the data are read out of data-frame buffer 55, thus providing checking for data errors that may arise as the data frames reside in data-frame buffer 55 or anywhere earlier in the travel of the data frames. Similarly, CRC validity-checking information that is received with non-data frames from the fibre-channel loops 1250 is stored with the data in non-data-frame buffer 53 (or 53'), and then checked when the data are read out of non-data-frame buffer 53 (or 53'), thus providing checking for data errors that may arise as the non-data frames reside in non-data-frame buffer 53 (or 53') or anywhere earlier in the travel of the data frames. Microprocessor 112 is any suitable high-speed processor, and is used to help control the overall data transfer, routing, signalling, error recovery, etc., within disc drive 100. In the present invention, fibre-channel interface chip 110 provides improved frame buffers, error checking, and loop arbitration, as described below.

In one embodiment, loop-port transceiver blocks 115 (i.e., 115 and 115') include port transceivers which serialize and deserialize data transfers through Port A and Port B to the fibre-channel loops 1250 (see FIG. 2) connected thereto. In some embodiments, transceivers 115 are implemented as external transceivers; in other embodiments, these transceivers are located on-chip in block 110. In some embodiments, the right-side interfaces (i.e., right side relative to the transceiver 115 or 115' of FIG. 1) are parallel input-output signals that are ten bits wide; in other embodiments, they are twenty bits wide. Together, blocks 110, 111, 112, port-A transceiver 115 and port-B transceiver 115' form fibre-channel node interface 1220. In some embodiments, port transceivers 115 and 115' are integrated within a single chip 110. In other embodiments, the transceivers 115 and 115', including their serializer/deserializer functions are implemented on circuits separate from chip 110.

In other embodiments, transceivers 115 are merely interfaces between the serial loop 1250 and chip 110, wherein the serialization/deserialization to ten-bit wide or twenty-bit-wide data occurs on-chip.

FIG. 2 is a schematic view of a computer system 1200. Advantageously, the present invention is well-suited for use in computer system 1200. Computer system 1200 may also be called an electronic system or an information-handling system and includes a central processing unit ("CPU"), a memory and a system bus. Computer system 1200 includes a CPU information-handling system 1202 having a central processing unit 1204, a random-access memory ("RAM") 1232, and a system bus 1230 for communicatively coupling the central processing unit 1204 and the random-access memory 1232. The CPU information-handling system 1202 includes the fibre-channel node interface 1220. Each one of the one or more disc-storage information-handling systems 100 through 100' includes one or more disc-drive device 1256 and a fibre-channel node interface 1220.

In some embodiments, multiple disc drives 1256 are connected to a single node interface 1220, for example in a RAID (redundant array of inexpensive/independent disc drives) configuration, such that device 100' is a RAID array of disc drives. The CPU information-handling system 1202 may also include an input/output interface circuit 1209 that drives an internal input/output bus 1210 and several peripheral devices, such as 1212,1214, and 1216, that may be attached to the input/output bus 1210. Peripheral devices may include hard-disc drives, magneto-optical drives, floppy-disc drives, monitors, keyboards and other such peripherals. Any type of disc drive or other peripheral device may use the fibre-channel methods and apparatus (especially, e.g., the improvements in fibre-channel node interface 1220) described herein. For each device, either the A port or the B port can be used to connect to any given loop 1250.

One embodiment of system 1200 optionally includes a second CPU information-handling system 1202' (which is identical or similar to system 1202) having central processing unit 1204' (which is identical to central processing unit 1204), a random-access memory ("RAM") 1232' (which is identical to RAM 1232), and a system bus 1230' (which is identical to system bus 1230) for communicatively coupling central processing unit 1204' and random-access memory 1232'. CPU information-handling system 1202' includes its own fibre-channel node interface 1220' (which is identical to node interface 1220), but is connected to one or more disc systems 100 (in this illustrated example, it is just connected to disc system 100', but in other examples is connected to all devices or disc systems 100 through 100') through a second fibre-channel loop 1250' (separate and independent from loop 1250). This configuration allows the two CPU systems 1202 and 1202' to share one or more of the disc systems 100 using separate fibre-channel loops for each CPU system 1202. In yet other embodiments, all devices 100 through 100', and all CPU systems 1202 through 1202', are connected to both loops 1250 and 1250'.

In one embodiment, the present invention does not support out-of-order delivery of data frames. The fibre-channel controller, according another embodiment of the present invention, also implements a protocol for organizing data frames of the code words for transmitting and receiving purposes, which protocol is disclosed in U.S. Pat. No. 5,260,933, entitled ACKNOWLEDGMENT PROTOCOL FOR SERIAL DATA NETWORK WITH OUT-OF-ORDER DELIVERY, by G. L. Rouse. The Fiber-Channel Specifications used in building one embodiment of the present invention include the following ANSI Standards:

| | |
|---|---|
| Fibre Channel FC-PH | X3T11/Project 755D/Rev. 4.3 Physical & Signalling Interface |
| Fibre Channel FC-AL | X3T11/Project 960D/Rev. 4.5 Arbitrated Loop |
| Fibre Channel FC-AL2 | X3T11/Project 1133D/Rev. 6.3 Arbitrated Loop |
| Fibre Channel FCP Protocol for SCSI | X3T10/ Rev. 012 X3.2 69-199X |

I. Dedicated Frame Buffer for Loop Initialization and Responses

For one embodiment of the present invention, frame buffers have been added to the third-generation application-specific integrated circuit ("ASIC") chip (the fibre-channel interface chip 110) to allow both ports to be active simultaneously. Two buffers that receive non-data frames (also called "receive-non-data-frame buffers" 53 and 53' of FIG. 1) are provided to allow commands and FCP frames (fibre-channel-protocol frames) to be received simultaneously at both ports of the node (and also to permit full-duplex operations, i.e., receiving on one fibre of a port while transmitting on the other fibre of the same port). This allows a disc drive 100 (see FIG. 2) to receive new commands (or other non-data frames) on one port during a data transfer on the same port and/or on the other port, rather than waiting until a pause or the end of the transfer. By having the commands earlier than in conventional approaches, the present invention allows the commands to be sorted and optimized while data transfers are progressing, thus improving the performance of the system 1200.

The transmit-frame buffer 73 (see description of FIG. 13) allows response frames to be transmitted on one port while a data transfer is active on the alternate port. This transmit-frame buffer 73 also allows loop initialization to be performed on one port without pausing or waiting for the transfer to complete on the other port.

In a dual-ported fibre-channel arbitrated loop design, on-chip frame buffers may be used to manage inbound and outbound frames. The on-chip RAM may be configured in various ways to strike a balance between performance and silicon real estate. The present specification details the use of a dedicated frame buffer 119 and a single-frame transmit path 70 that are used to store and transmit fibre-channel loop-initialization frames and single-frame fibre-channel responses.

In a dual-ported design, one port may be receiving or transmitting data and using most of the ASIC resources to handle the transfer. Many counters and state machines may be required to handle this type of multi-frame sequence.

Without duplicating the design for each port or pausing the data transfer, in the present invention a limited amount of logic is required to provide functions for the alternate port to allow it to receive and transmit frames while the primary port is transferring data. In some embodiments of the present invention, a dedicated transmit-frame buffer 73 is provided (shown in FIG. 13), along with single-frame-transmit-path circuit 70, to provide the ability to transmit frames on one port while the other port is transferring data. The logic may be configured dynamically, so that either port may transfer data or use the transmit-frame buffer 73.

When data are transferring on the primary port and loop initialization is being performed on the alternate port, the data transfer is allowed to continue without interruption. Loop-initialization frames (which are non-data frames) that are received are validated before the frame is written to a frame buffer (e.g., transmit-frame buffer 73: see FIG. 13). A microprocessor 112 has write/read access to the transmit-frame buffer 73 to allow it to examine and modify a received frame before allowing it to be transmitted out. The "header" and "payload" of the frame are stored in the frame buffer. (The "header" of a frame includes such information as the Source Identifier, Sequence Count, and Originator Identifier of the frame. The "payload" of a frame is the main body of data to be transmitted.) The single-frame-transmit path 70 (see FIG. 3), under control of microprocessor 112, assembles the frame and includes the start-of-frame and end-of-frame delimiters and generates the frame cyclic-redundancy-code ("CRC") information.

Figure 3:
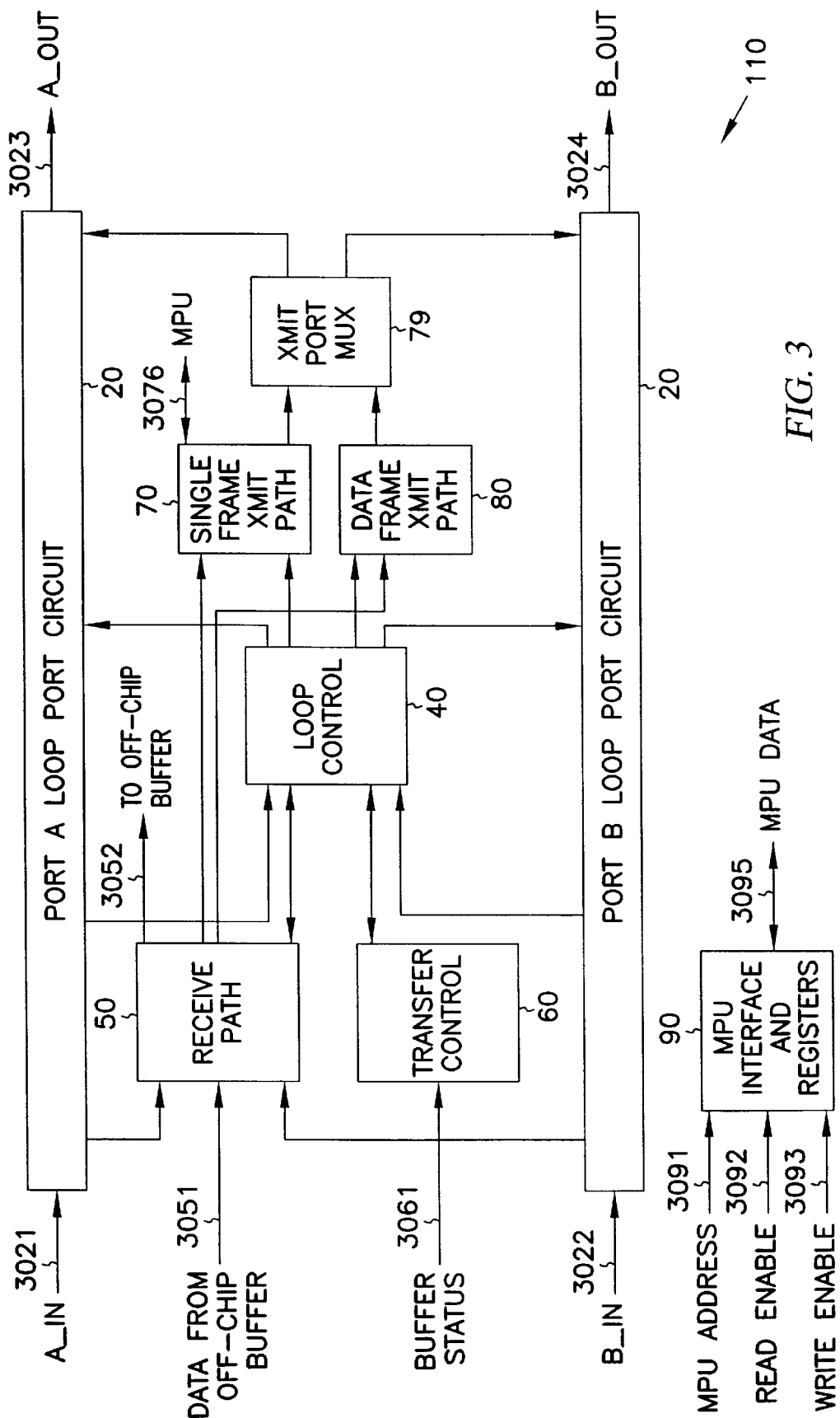
FIG. 3 is a block diagram of a fibre-channel node-interface chip 110.

When data frames are transferring on the primary port and the transmission of a Fiber-Channel-Protocol (FCP) response frame is required, the data transfer is allowed to continue without interruption. Referring to FIG. 3, microprocessor 112 places the header and payload of the response frame into the transmit-frame buffer 73. The single-frame-transmit circuit 70 assembles the frame and includes the start-of-frame and end-of-frame delimiters and generates the frame CRC information. Some additional loop control logic is also provided to open the loop 1250 for frame transmission.

Figure 13:
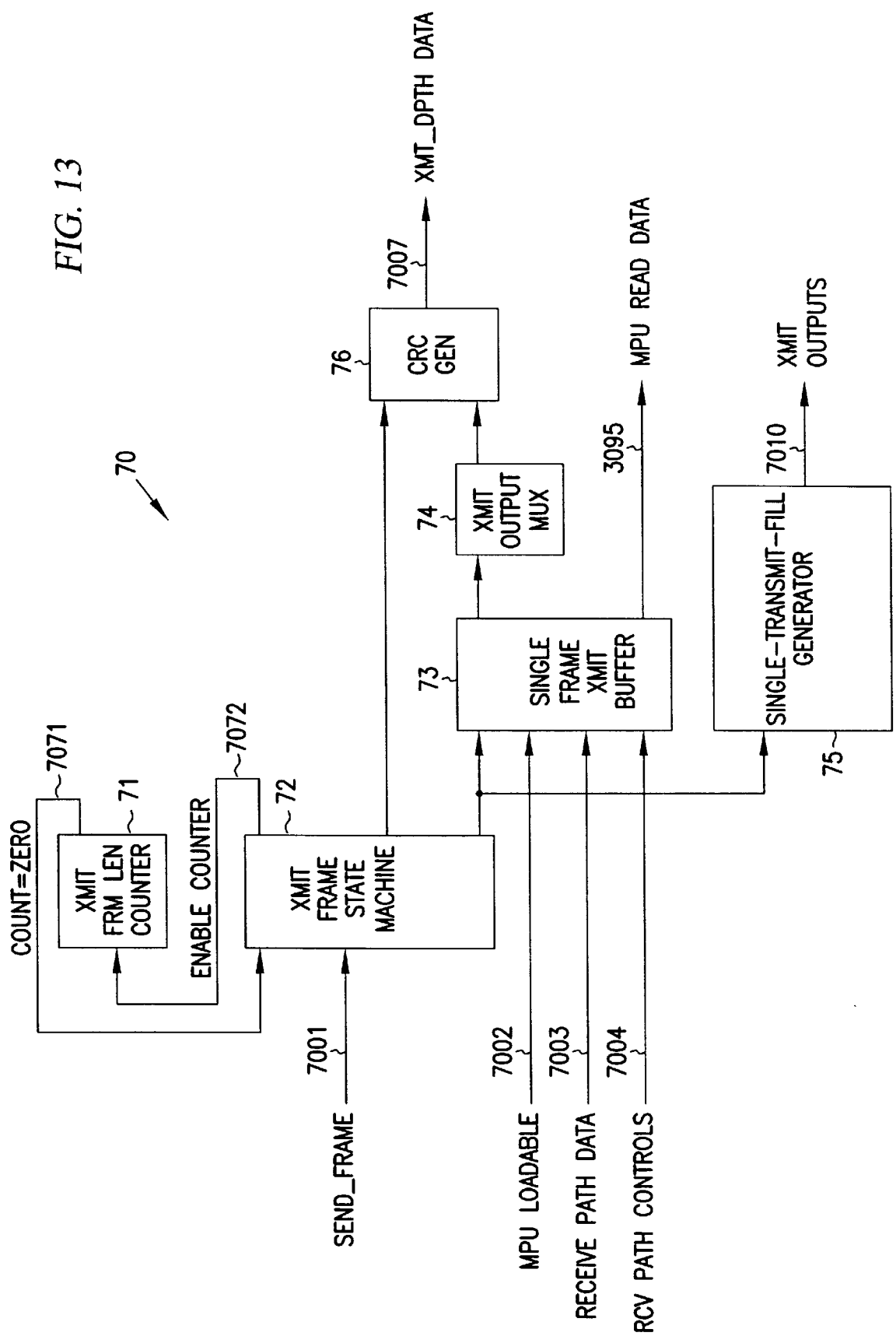
FIG. 13 is a block diagram of a fibre-channel transmit path circuit 70.
Figure 14:
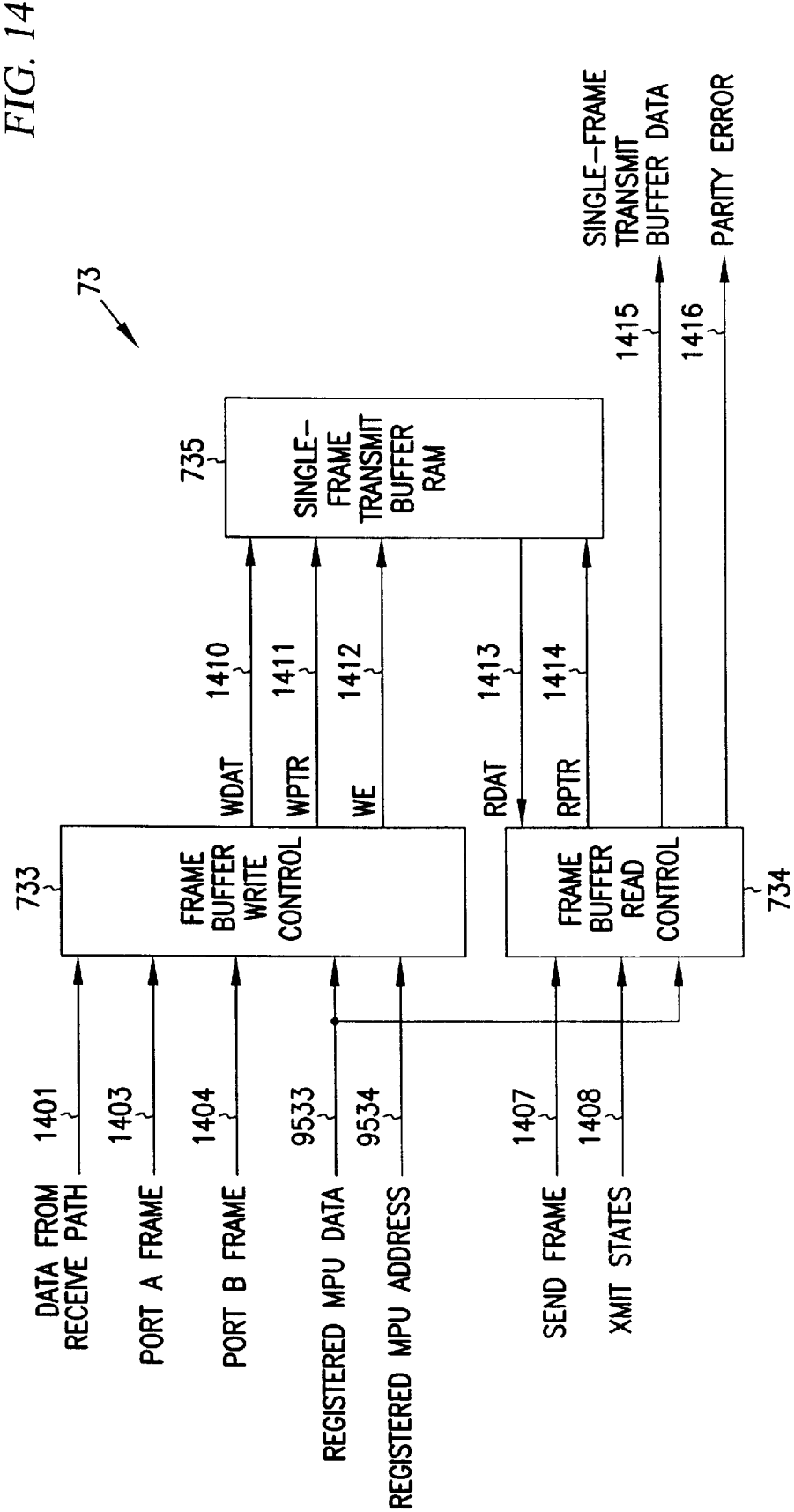
FIG. 14 is a block diagram of a fibre-channel transmit-frame buffer circuit 73.

Referring to FIG. 14, transmit-frame buffer 73 requires write and read pointers (733 and 734, respectively). (Although sometimes denoted as a "single-frame transmit-frame buffer" or a "transmit-frame buffer," buffer 73 is generically a "transmit-frame buffer," and in other embodiments buffer 73 includes one or more transmit frames for each one of one or more ports; the term "transmit-frame buffer" is used herein to include all such embodiments.) The single-frame-transmit circuit 70 (a detailed description of which is shown below in FIG. 13) requires a frame-length counter 71, transmit-framing state machine 72, CRC generator 76, and transmit multiplexer ("mux") 74.

Fiber-Channel Interface Description

FIG. 3 is a block diagram of a fibre-channel node-interface chip 110. The fibre-channel node-interface logic 110 in the present invention is responsible for the fibre-channel protocol including the arbitrated loop logic and framing logic. One embodiment is optimized for a class-3 SCSI implementation (see the FC AL specifications noted above) using only the SCSI upper-level protocol defined by the fibre-channel protocol ("FCP") standard. The fibre-channel node-interface logic 110 includes four on-chip frame buffers (53, 53', 55, and 73) to assist in dual-port and full-duplex operations, as well as to support a variety of buffer bandwidths. The fibre-channel node-interface logic 110 also interfaces to a microprocessor 112, which allows microprocessor 112 to configure the fibre-channel node-interface logic 110 and to read status information about the present condition of the fibre-channel node-interface logic 110.

The fibre-channel node-interface logic 110 includes two loop port circuits 20 (one for Port A and another for Port B, each port having a data-in interface and a data-out interface to support loop communications), loop-control circuit 40 (also called frame-transmit circuit 40), receive-path logic 50, transfer-control logic 60, single-frame-transmit circuit 70, transmit-path multiplexer ("mux") 79, data-frame-transmit-path logic 80, and microprocessor interface 90. These blocks support such functions as receive-frame processing, transmit-data-frame generation, single-frame-transmit generation, transfer control, and processor interfacing.

Microprocessor interface circuit 90 provides microprocessor 112 access to the registers and counters in the fibre-channel node-interface logic 110. (When a "microprocessor" is described, it is to be understood that such term includes any suitable programmable logic device.) The interface registers are initialized by an external microprocessor 112 prior to responding of the fibre-channel interface. Output transfers are initialized through this interface and status of received transfers is available through this interface.

The input signals for FIG. 3 include A_IN 3021 which conveys data input from the fibre channel 16 into loop port circuit 20 for Port A, and B_IN 3022 which conveys data input from the fibre channel 16 into loop port circuit 20 for Port B. DATA FROM OFF-CHIP BUFFER 3051 conveys data from off-chip buffer 111 to receive path 50. TO OFF-CHIP BUFFER 3052 conveys data to off-chip buffer 111 from receive path 50. BUFFER STATUS 3061 provides status to transfer control 60. MPU ADDRESS 3091 and MPU DATA 3095 into MPU interface 90 provide address and data, respectively, from microprocessor 112. READ_ENABLE 3092 and WRITE_ENABLE 3093 into MPU interface 90 provide enable signals from microprocessor 112. Signals MPU 3076 allow microprocessor 112 to access transmit-frame buffer 73. A_OUT 3023 conveys data to the fibre channel 16 from loop port circuit 20 for Port A, and B_OUT 3024 conveys data to the fibre channel 16 from loop port circuit 20 for Port B.

Loop Port Circuits 20

Figure 4:
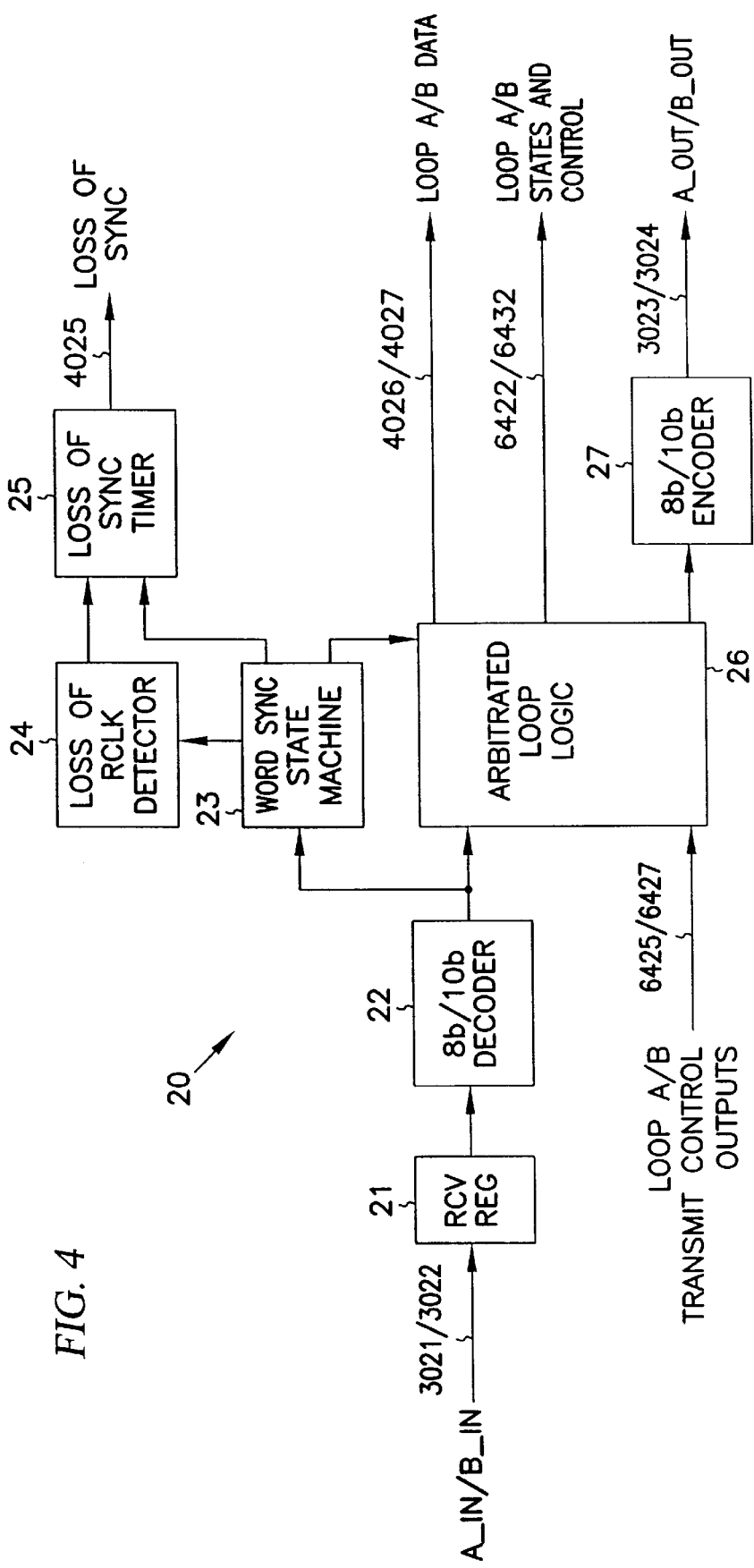
FIG. 4 is a block diagram of a fibre-channel loop port circuit 20.

FIG. 4 is a block diagram of a fibre-channel loop port circuit 20. The fibre-channel design of one embodiment of the present invention includes two identical loop port circuits 20 to support a dual-ported fibre-channel interface for direct attachment of peripherals. In one embodiment, fibre-channel loop port circuit 20 includes receive register 21, 8B/10B decoder logic 22, word-sync state machine 23, loss-of-receive-clock detector 24, loss-of-sync timer 25, arbitrated-loop logic 26, and 8B/10 B encoder 27.

In one embodiment, each of loop port circuits 20 interface to external transceivers 115 (see FIG. 1) using a ten-bit data interface. In such an embodiment, the transceivers 115 serialize and deserialize serial data to and from a parallel interface (e.g., a ten-bit-wide or a twenty-bit-wide interface). In other embodiments, these transceivers 115 are integrated into chip 110. The parallel data (input from the fibre channel) are captured using receive clocks from the receiver portion of each transceiver 115, and are converted to a twenty-bit-wide format before decoding using a parallel 8B/10B decoder. The sixteen-bit data plus two k-characters (used to denote special ordered sets) are then checked for word validity before being placed in the arbitrated-loop logic 26. The output of the arbitrated-loop logic 26 is re-synchronized to the transmitter clock and may be passed to the receive-framing logic or re-transmitted on the loop 1250 through encoder 27. In one embodiment, encoder 27 converts one eight-bit character to one ten-bit character during each operation; in other embodiments, two or more eight-bit characters are converted into the corresponding number of ten-bit characters in each operation. (See U.S. Pat. No. 5,663,724 entitled "16B/20B Encoder.") The arbitrated-loop logic 26 includes a loop state machine, an ordered-set decoder, and elasticity insert and delete functions. Loop-port circuits 20 implement the Arbitrated-Loop Protocol as defined in the Fiber-Channel Arbitrated-Loop ANSI standard (i.e., FC-AL and/or FC-AL2, described above).

In one embodiment, fibre-channel data are transmitted serially and converted to ten-bit parallel data by the transceiver 115. Receive register 21 captures the ten-bit data (A_IN 3021 or B_IN 3022) from the transceiver 115 using clocks generated by the receiver portion of transceiver 115. The data are immediately converted to twenty bits wide (i.e., two ten-bit characters wide) before being passed through the 8B/10B decoder 22. Although called an "8B/10B decoder," decoder 22, in one embodiment, converts one ten-bit character to one eight-bit character during each operation; in other embodiments, two or more ten-bit characters are converted into the corresponding number of eight-bit characters in each operation.

The 8B/10B decoder logic 22 inputs the encoded data captured by the receive register 21. Two ten-bit characters are decoded in parallel to output two eight-bit characters. Running disparity of the input characters is checked and error status is passed to word-sync state machine 23, as well as to the arbitrated-loop logic 26. Negative running disparity is forced on the next ordered set following a running disparity error. Violations to the coding rules are also checked and code-violation status is passed to word-sync state machine 23.

The loss-of-receive-clock detector 24 detects when the receive clocks from the transceiver 115 have stopped. When a "loss-of-receive-clock" condition is detected, word-sync state machine 23 is reset and data are prevented from going into the FIFO in arbitrated-loop logic 26 (a FIFO is a first-in first-out memory, typically used to interface between busses or processes having different speeds). The current-fill-word ("CFW", described more below) is transmitted until word sync is re-gained.

Word-sync state machine 23 logic monitors the input stream for word sync. Word-sync is achieved when three valid ordered sets are detected with proper byte/control character alignment, and no intervening invalid characters are detected. "Loss-of-word-sync" is defined per the FC-PH (i.e., FC-PH Physical & Signalling Interface X3T11/Project 755D/Rev. 4.3) standard. When word-sync is achieved, data are input into the FIFO in arbitrated-loop logic 26.

The loss-of-sync timer 25 is used to determine when a loss-of-word-sync condition has been present for more than one maximum frame time (since it may take up to a frame time to detect three valid ordered sets). When this timer expires, microprocessor 112 is interrupted with the LOSS-OF-SYNC interrupt signal 4025, so that it may take action.

The arbitrated-loop logic 26 includes a loop-elasticity FIFO, loop FIFO control logic, ordered set-decode logic, loop-state-machine logic, current-fill-word-selection logic, loop-output multiplexer logic, and miscellaneous functions. The loop-elasticity FIFO provides the buffering required to re-synchronize the input data (clocked by the receive clock) with the transmit clock. The loop FIFO control logic monitors the status of the arbitrated-loop logic 26 to determine whether an insert or delete operation may be required. Ordered sets are decoded by the ordered-set-recognition logic. These ordered sets include FC-PH defined ordered sets (i.e., FC-PH Physical & Signalling Interface X3T11/ Project 755D/Rev. 4.3), which include frame delimiters and arbitrated-loop ordered sets. The current-fill-word-selection logic monitors the loop states and decoded ordered sets to determine the current-fill-word ("CFW"). When the arbitrated loop is enabled, a hardware state machine uses the ordered-set decodes to perform the loop functions described in the FC-AL standard (i.e., Fiber-Channel FC-AL1 Arbitrated Loop standard X3T11/Project 960D/Rev. 4.5, or Fiber-Channel FC-AL2 Arbitrated Loop standard X3T11/ Project 1133D/Rev. 6.3). The inputs LOOP A TRANSMIT CONTROL OUTPUTS 6425 and LOOP B TRANSMIT CONTROL OUTPUTS 6427 provide input to arbitrated-loop logic 26 from the logic in FIG. 6. The outputs LOOP A STATES AND CONTROL 6422 and LOOP B STATES AND CONTROL 6432 control the output of the respective loops and provide status to the loop-control logic, which in turns generates requests to the loop-state machine (see FIG. 6). The outputs LOOP A DATA 4026 and LOOP B DATA 4027 provide data to the respective local ports (to blocks 51 and 51' respectively of FIG. 7).

In one embodiment, 8B/10B encoder logic 27 accepts the sixteen-bit data and 2 k-characters (lower k is always 0) from arbitrated-loop logic 26. In one embodiment, the inputs are encoded into two ten-bit characters which are separated and output one at a time to transceiver 115 (see FIG. 1), which converts the data to a serial stream. In other embodiments, both ten-bit characters (i.e., twenty bits) are sent in parallel to transceiver 115, which converts the data to a serial stream. The transmit multiplexer 79 (see FIG. 3) also provides status to indicate when the end-of-frame ("EOF") delimiter is being transferred, to allow the encoder 27 to select the correct type (or "flavor") of the EOF based on the current running disparity. Also, when the port is transmitting (in an Opened state) or when arbitrated-loop logic 26 is transmitting a primitive, the running disparity is forced to negative at the start of each non-EOF primitive. The output signals A__OUT 3023 and B__OUT 3024 transmit data to the respective transceivers 115 and 115'.

Figure 5:
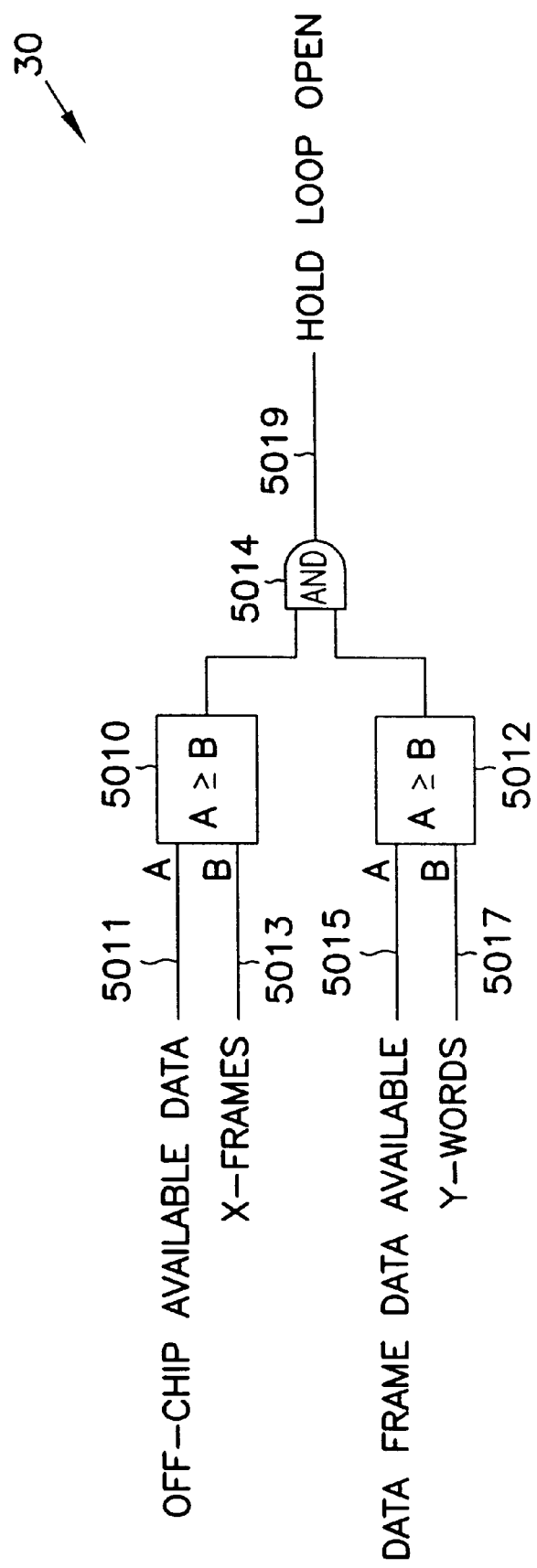
FIG. 5 is a block diagram of comparator logic 30 used, in one embodiment, to hold a loop open.

FIG. 5 shows comparator logic 30 used, in one embodiment, to hold a loop open, once control is achieved by arbitration. The amount of OFF-CHIP AVAILABLE DATA 5011 is compared to a predetermined value X-FRAMES 5013 (which, in one embodiment, is a programmable value, and an optimal value is determined empirically; in one embodiment, this value is set to one frame) by comparator 5010. The amount of DATA-FRAME DATA AVAILABLE 5015 is compared to a predetermined value Y-WORDS 5017 (which, in one embodiment, is a programmable value, and an optimal value is determined empirically; in one embodiment, this value is set to the number of words in one-half of a frame; in one embodiment, there are about 2000 words, and Y-WORDS is about 1,000) by comparator 5012. AND gate 5014 determines when both conditions are met, and outputs HOLD LOOP OPEN signal 5019.

Figure 6:
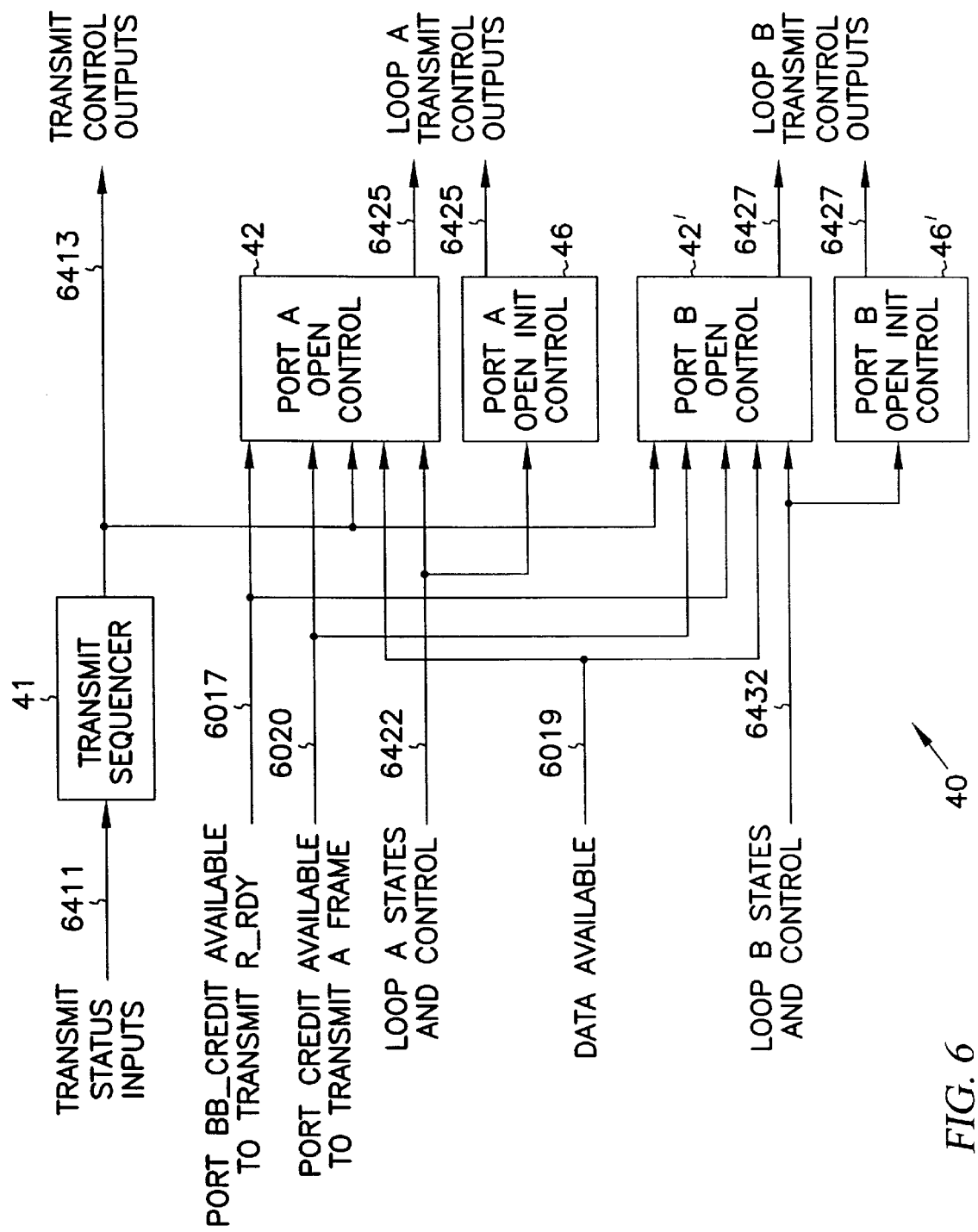
FIG. 6 is a block diagram of a fibre-channel loop-control circuit 40.

FIG. 6 is a block diagram of loop-control circuit 40 (also called frame transmit ("XMIT") circuit 40). Loop-control circuit 40 (see FIGS. 3 and 6) includes control logic to generate requests to the appropriate arbitrated-loop state machine (in arbitrated-loop logic 26 of Port A and Port B) as well as to generate requests to the transmit framing state machines 72 (see FIG. 13) and 81 (see FIG. 15) to begin transmitting frames or R__RDY's .

Transmit-data-sequencer logic 41 includes logic that is activated when a transfer is requested by microprocessor 112. Transmit-data-sequencer logic 41 monitors the transfer using input signals TRANSMIT STATUS INPUTS 6411 and generates "enables" (i.e., enable signals TRANSMIT CONTROL OUTPUTS 6413) for each stage of the transfer. This allows the transfer-ready and FCP responses to be generated without intervention of microprocessor 112.

Loop-port A/B open-control state machines 42 (Port A) and 42' (Port B) handle the case where the port is opened by another L__Port or when the loop 1250 is opened to transmit frames. This logic generates requests to arbitrate and to close the loop 1250, and requests to transmit R__RDY's and frames of various sorts, and can be configured for half-duplex or full-duplex operation.

The following conditions must be met to begin a request to arbitrate:

a request from microprocessor 112 to transmit a frame with xmit port enable, the transmitting port is in the Monitoring state, transfer-length count not zero, no request from microprocessor 112 to pause a transfer, and (non-data transfer, or data-write transfer with transfer-ready not yet transmitted with data threshold met, or data-read transfer with data threshold met and data-frame buffer threshold met).

Figure 12:
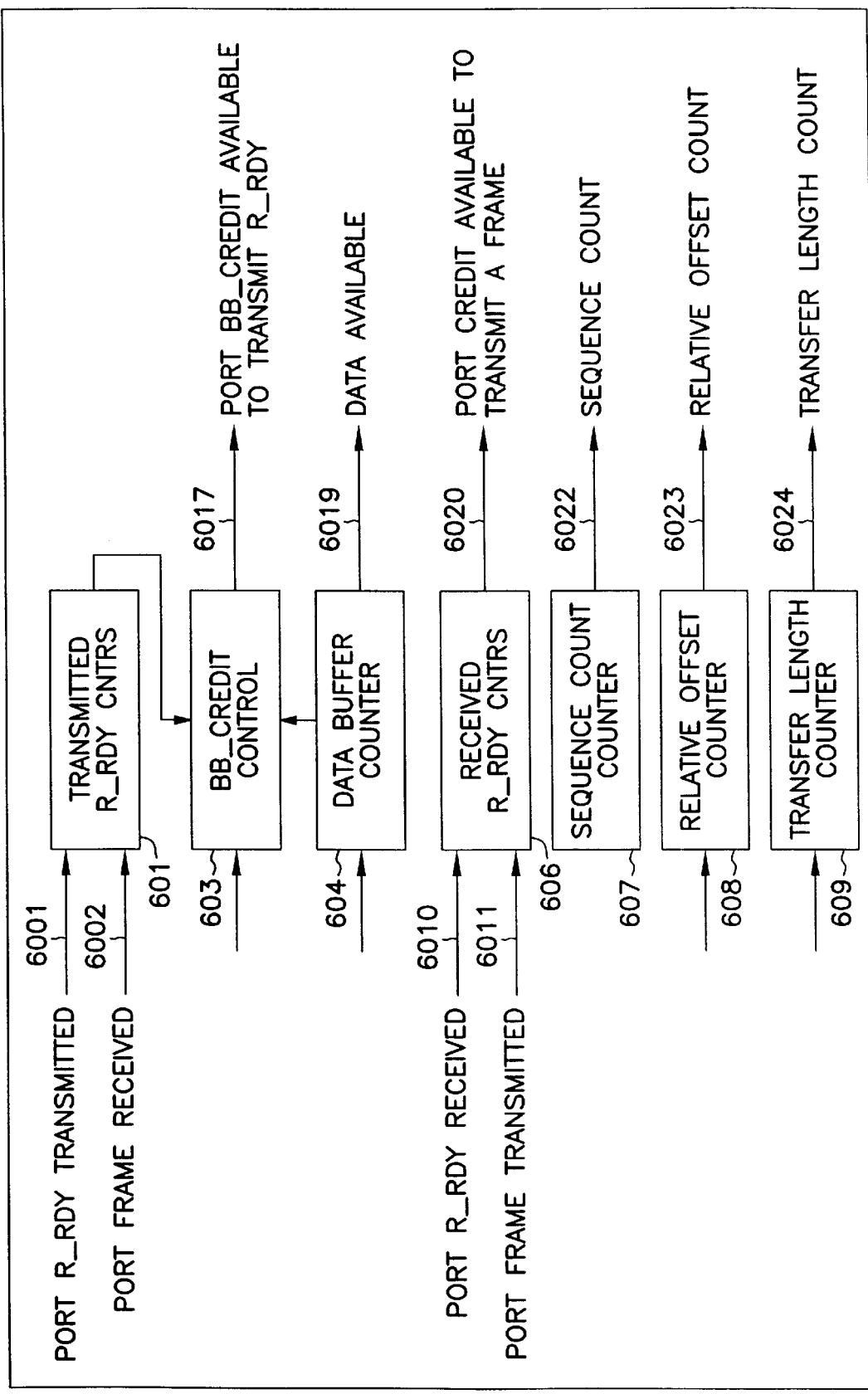
FIG. 12 is a block diagram of a fibre-channel transfer-control circuit 60.

When the port is configured for half-duplex mode, R_RDY's may be transmitted only when in the Opened state. When the port is configured for full-duplex mode, R_RDY's may be transmitted in either Opened state or Open state. Conditions that cause an R_RDY to be transmitted include "Buffer-to-Buffer Credit (BB_Credit) available and outstanding R_RDY's less than maximum BB_Credit." (Buffer-to-Buffer Credit control logic 603, which is described below in FIG. 12, issues buffer credit to the connected port to allow frames to be sent. This credit is issued by sending R_RDY's.)

When the port is configured for half-duplex mode, frames may be transmitted only when in the Open state. When the port is configured for full-duplex mode, frames may be transmitted in Open state or in Opened state if the port was opened in full-duplex mode by the frame recipient.

A request to transmit a frame will be generated when all the following conditions are met:

data-frame buffer 55 has data available

Buffer-to-Buffer Credit is available (R_RDY received)

non-data transfer, or data-read transfer and transfer-length counter (in block 609; see FIG. 12) is non-zero Conditions that cause the loop 1250 to be closed include:

no Buffer-to-Buffer Credit is available when entering the Opened state there are no outstanding R_RDY's and no more BB_Credit is available when in Opened state a processor busy request is active when the port is in Opened state the transfer has completed data-read transfer operation and data are not available a CLS primitive is received and no more BB_Credit is available a microprocessor pause request is pending and the logic is between frames Referring again to FIG. 6, loop-port A/B open-init-control state machines 46 (Port A) and 46' (Port B) handle the case of when the loop 1250 is in the Open-Init state. This logic 46 and 46' generates requests to transmit frames. There is one state machine for each port (46 and 46', respectively). These state machines will generate a request to transmit a frame when microprocessor 112 requests it, and will monitor for the transmission of the EOF. When the transmission is complete, a transfer-complete is generated to microprocessor 112.

The inputs to block 40 include PORT BB_CREDIT AVAILABLE TO TRANSMIT R_RDY 6017 and PORT CREDIT AVAILABLE TO TRANSMIT A FRAME 6020 (see FIG. 12), LOOP A STATES AND CONTROL 6422 and LOOP B STATES AND CONTROL 6432 (see FIG. 4), and DATA AVAILABLE 6019 (See FIG. 12). The outputs from block 40 include TRANSMIT CONTROL OUTPUTS 6413, LOOP A TRANSMIT CONTROL OUTPUTS 6425, and LOOP B TRANSMIT CONTROL OUTPUTS 6427.

Further information regarding the single-frame transmit path is found below in the section entitled Single-Frame-Transmit-Path Circuit 70.

II. Dedicated Frame Buffers for Receiving Frames

In a dual-ported fibre-channel arbitrated-loop design 1200, the buffers in on-chip frame buffer 119 may be used to manage inbound and outbound frames. Frames received and transmitted are usually stored in a large off-chip area (e.g., off-chip buffer 111) at a slower transfer rate. Even when off-chip buffer 111 is capable of the full transfer rate for a single port, for a dual-ported design the bandwidth required will be much greater, adding additional cost. On-chip frame buffer 119 in the FC-AL ASIC 110 (see FIG. 1) may be configured in various ways to strike a balance between performance, silicon real estate, and cost. The present specification details the use of dedicated frame buffers 53 and 53' (components of the overall on-chip frame buffer 119) to receive non-data type frames simultaneously on each port, as well as providing a dedicated large data-frame buffer 55 (also a component of the overall on-chip frame buffer 119).

In a dual-ported design according to the present invention, frames may be received on both ports 116 simultaneously. The frames are usually moved to and stored in a larger off-chip memory 111 after they are received. Each frame must be validated and the frame cyclic-redundancy-code ("CRC") information must be checked before transferring the frame off-chip. To avoid duplicating the receive-frame-validation and CRC-checker logic, individual receive-non-data-frame buffers 53 and 53' are provided, one at each port 116, to allow frames to be received simultaneously at full interface rates, and then read one-at-a-time, validated, and transferred off-chip. A large common data-frame buffer 55 is also provided to be shared between the ports so that data may be received or transmitted on one port while non-data frames are received on the other port simultaneously. Further, since two individual one-way fibres are provided at each port, a single port can be transmitting and receiving at the same time.

For example, the Port A receive fibre 117 can receive non-data frames into non-data receive buffer 53 while the Port A transmit fibre 118 is either transmitting data frames from data-frame buffer 55, or transmitting non-data frames from transmit-frame buffer 73; and simultaneously Port B can receive non-data frames to non-data receive buffer 53' while transmitting non-data frames from transmit-frame buffer 73 or data frames from data-frame buffer 55 (in the case where Port A is transmitting non-data frames). Either the data-frame buffer 55, or one of the receive-frame buffers 53 or 53', may be selected to use the receive-frame-validation logic and CRC checker. Note that, for one embodiment of the present invention, a single data-frame buffer 55 is provided, and can only used for one port 116 at a time, and is used for either transmitting or receiving at any one time. In other embodiments, multiple data-frame buffers 55 are provided to remove such a restriction. Also note that, for one embodiment of the present invention, a single transmit-frame buffer 73 is provided, and can only used for one port 116 at a time. In other embodiments, multiple transmit-frame buffers 73 are provided to remove such a restriction, and to allow truly simultaneous loop initialization operations (or other non-data responses to be sent) on both ports.

When an inbound data transfer is active, either data or non-data frames may be received on the primary port. At the same time, non-data frames may be received on the alternate port. Data frames (which include header, payload, CRC, and frame delimiters) are placed into a large data-frame buffer 55 while non-data frames (which also include header, payload, CRC, and frame delimiters) are placed in smaller receive-frame buffers 53 (or 53'). There is one receive-frame buffer 53 provided for each port 116. When one of the three frame buffers (53, 53' or 55) has data available, it will be selected to use the receive-validation logic 595 and the CRC-checker logic 596 (see FIG. 11).

When an outbound data transfer is active, data frames are transmitted on the primary port. At the same time, non-data frames may be received on either port. The data payload is read from off-chip and written to the data-frame buffer 55 and stored until the interface transfer can begin. (The header, CRC, and frame delimiters are added after the frame is read from the frame buffer.) At the same time, non-data frames may be received on either the primary or alternate port. The non-data frames are written to the receive-frame buffers 53 or 53' to be held until the frame buffer is given access to the receive-validation logic 595 and CRC-checker logic 596.

Priority is given to the data-frame buffer 55 in order to provide the data transfer with the highest performance possible. The non-data frames will be handled when the data transfer pauses or is complete. If one of the receive-frame buffers 53 fills, such that loop Buffer-to-Buffer Credit is no longer available, the write/read operation of the data-frame buffer 55 will be suspended to free receive-frame buffer space so that Buffer-to-Buffer Credit will again be available. Inbound data frames may accumulate in the data-frame buffer 55 during this time, since new frames may be written to the data-frame RAM 555 while the read was suspended for a short time. Outbound data frames available for the interface may be reduced temporarily during this time, since frames may be read from the RAM 555 while the write was suspended for a short time.

Figure 7:
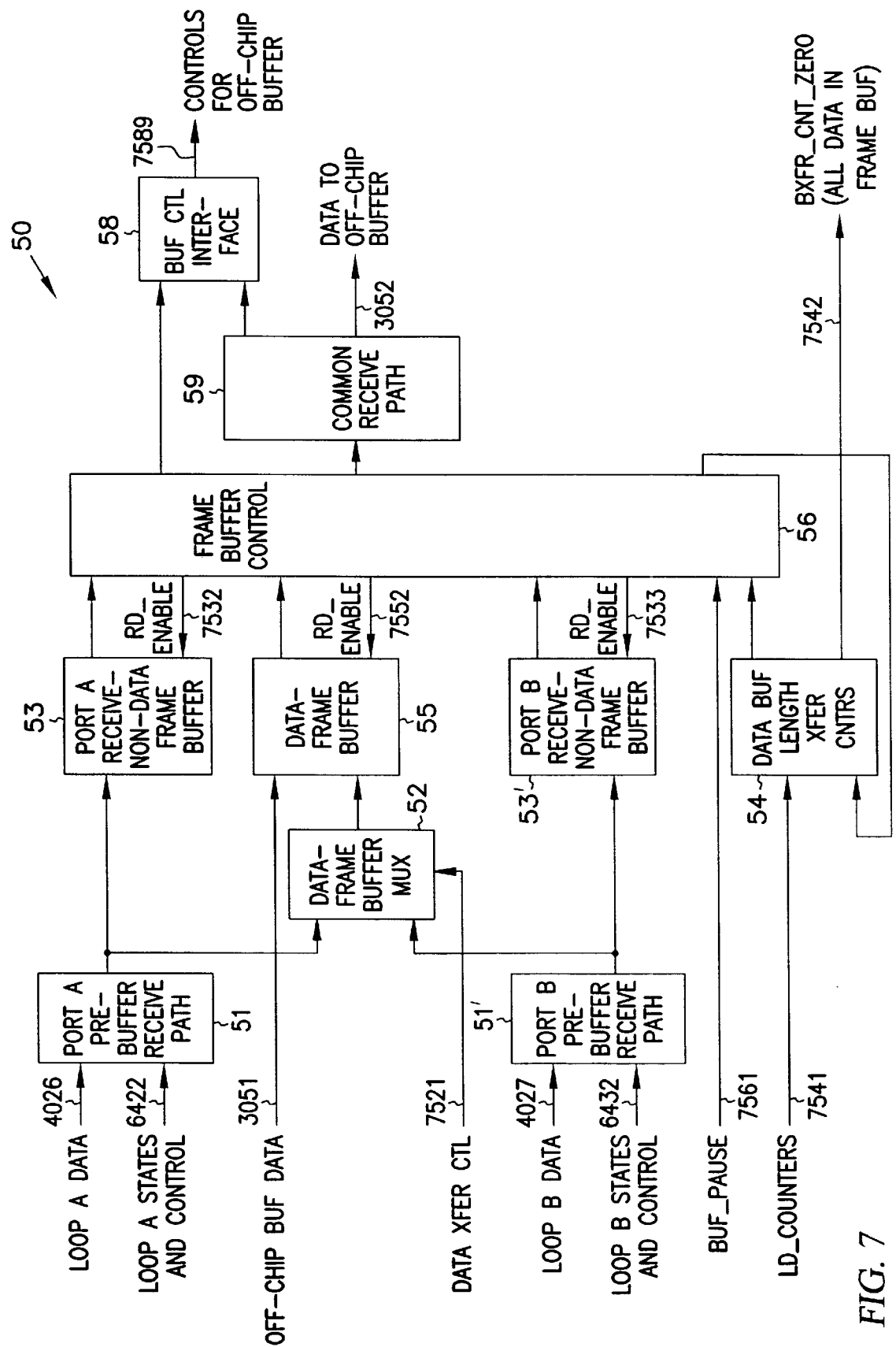
FIG. 7 is a block diagram of a fibre-channel receive path circuit 50.

FIG. 7 is a block diagram of fibre-channel receive-path and frame-buffers block 50 (see FIG. 3). Receive-path and frame-buffers block 50 processes received frame(s) and sends the frame(s) directly off-chip (to off-chip buffer 111) or to the single-frame-transmit circuit 70 or stores the frame(s) in one of the three frame buffers that receive frames (receive-non-data-frame buffers 53 or 53', or data-frame buffer 55). The receive path 50 includes the pre-buffer-receive-frame processing (blocks 51 and 51'), data-frame-buffer multiplexer 52, port-A and port-B receive-non-data-frame buffers 53 and 53' respectively, data-frame buffer 55, data-frame-buffer transfer-length counters 54, frame-buffer controller 56, common receive path 59, and buffer interface 58 blocks.

The inputs to block 51 include LOOP A DATA 4026 from FIG. 4, and LOOP A STATES AND CONTROL 6422 (which also inputs to FIG. 6). The inputs to block 51' include LOOP B DATA 4027 from FIG. 4, and LOOP B STATES AND CONTROL 6432 (which also inputs to FIG. 6). The inputs to data-frame buffer 55 include OFF-CHIP BUFFER DATA 3051. Signal DATA XFER CONTROL 7521 controls data-frame buffer multiplexer 52. Signal BUF_PAUSE 7561 signals to frame-buffer controller 56 that a pause is required (usually due to a buffer not being able to keep up with a transfer-rate bandwidth). Signal LD_COUNTERS 7541 signals to data-frame-buffer transfer-length counters 54 to load counter values.

Output signal BXFR_CNT_ZERO 7542 indicates that all the data of a transfer is in the selected frame buffer. Frame buffer controller 56 provides read enable signals RD_ENABLE 7532 to the port A receive-non-data frame buffer 53, RD_ENABLE 7552 to the data-frame buffer 55, and RD_ENABLE 7533 to the port B receive-non-data frame buffer 53'. Buffer-control-interface 58 provides select, strobe, and/or enable signals CONTROLS FOR OFF-CHIP BUFFER 7589 for off-chip buffer 111. Output DATA TO OFF-CHIP BUFFER 3052 provides received data frames and non-data frames to off-chip buffer 111.

Data-frame-buffer multiplexer 52 selects the data and the outputs of pre-buffer-receive state machine 512 from the port which has the DATA XFER CTL 7521 bit set. The output of this multiplexer 52 provides the data-frame buffer 55 with data and state signals (8511 and 8512, respectively, in FIG. 10) so that data can be written into data-frame-buffer RAM 555 (see FIG. 10).

Figure 8:
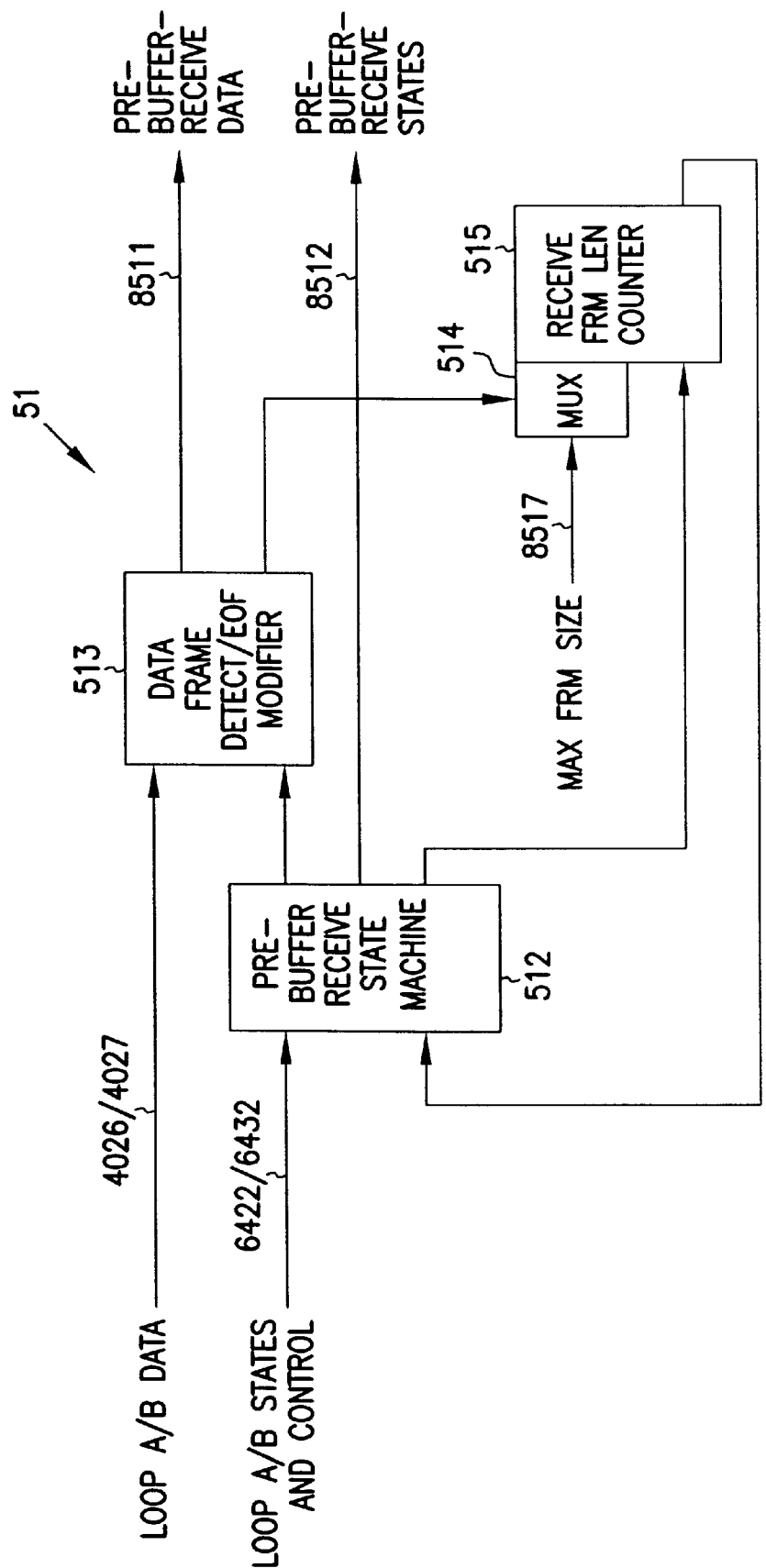
FIG. 8 is a block diagram of a fibre-channel pre-buffer-receive path circuit 51.

FIG. 8 is a block diagram of a fibre-channel pre-buffer-receive-frame-processing-path circuit 51, which prepares a frame received from the fibre channel 1250 to be inputted into one of the three frame buffers (53, 53', or 55). Pre-buffer-receive-path block 51 includes pre-buffer-receive-framing state machine 512, pre-buffer-receive-frame length counter 515 (and its multiplexer 514), and EOF-modifier logic 513. This block 51 is duplicated (i.e., implemented once in each port) for Port A and Port B, since frames may be received on both ports simultaneously.

Pre-buffer-receive-framing state machine 512 monitors the input stream to determine when frames and R_RDY's are being received. When an SOF is detected, signals are generated for each word of the header, the payload, and frame delimiters. This state machine 512 checks for invalid primitives received during the header or payload and for transfers that violate the maximum frame length (possibly due to a corrupted EOF).

Pre-buffer-receive-frame length counter 515 is loaded at the beginning of a frame with the maximum frame length (as selected by multiplexer 514) of either the command, other or data-buffer areas of the frame buffer which will be the destination of the received frame, based of the R_CTL field of the header of the received frame. If the counter reaches zero before the EOF is detected, a length error is detected. This function helps prevent overrunning the allocated space in the frame buffers.

EOF-modifier logic 513 checks an inbound frame to see whether it is a data frame, and generates an enable for the frame buffers. EOF-modifier logic 513 captures the Routing-Control field of the inbound frame to be used by the pre-buffer-receive-frame length counter 515. EOF-modifier logic 513 also modifies the EOF field so that more-detailed status information may be passed through the frame buffers to the common receive path 59.

Input signals LOOP A DATA 4026 and LOOP B DATA 4027 from FIG. 4 are coupled to EOF-modifier logic 513. LOOP A STATES AND CONTROL 6422 and LOOP B STATES AND CONTROL 6432 (which also input to FIG. 6) provide status information regarding the loop 1250 to state machine 512. MAX FRAME SIZE 8517 provides information regarding the maximum frame size for data frames, control frames and other frames to multiplexer 514 and counter 515.

Output signals PRE-BUFFER-RECEIVE DATA 8511 and PRE-BUFFER-RECEIVE STATES 8512 provide data and state information to non-data buffers 53 and 53' (see FIG. 9), and data-frame buffer 55.

Figure 9:
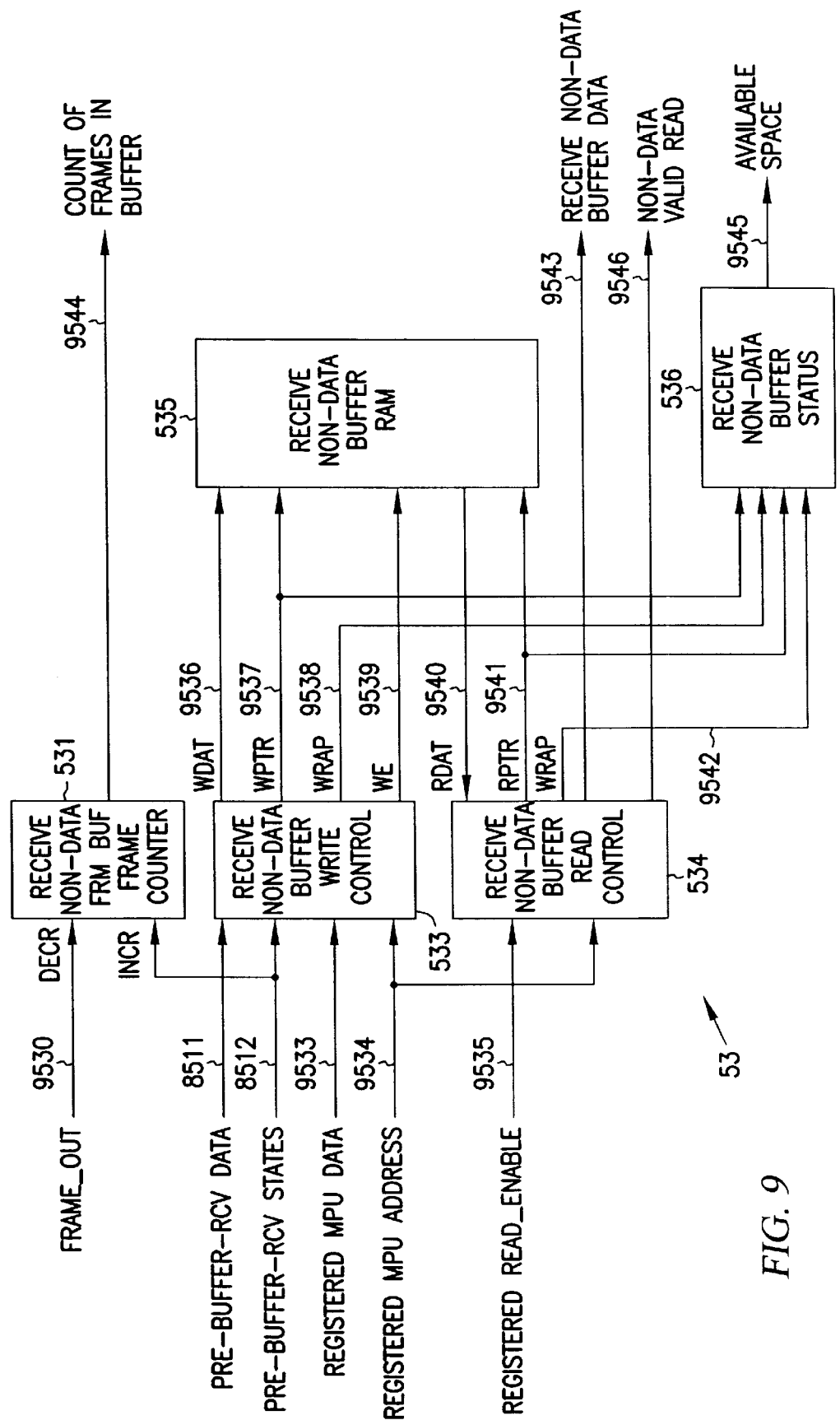
FIG. 9 is a block diagram of a fibre-channel receive-frame non-data buffer circuit 53.

FIG. 9 is a block diagram of a fibre-channel receive-non-data-frame-buffer circuit 53. The receive-non-data-frame buffer 53 includes the receive-frame-buffer write control 533, receive-frame-buffer read control 534, receive-frame-buffer RAM 535, receive-frame-buffer status block 536, and receive-frame-buffer frame counter 531. This circuit 53 is implemented once each for both Port A and Port B, since frames may be received on both ports simultaneously.

Receive-frame-buffer write-control block 533 generates address (WPTR 9537), data (WDAT 9536), and write enables (WE 9539) for the random-access memory ("RAM") in receive-frame-buffer RAM 535. When data for a frame are received, the state enables from pre-buffer-receive state machine 512 are used to develop a write enable (WE 9539) to the RAM 535. The address is incremented and a wrap bit (WRAP 9538) is provided to be used by receive-frame-buffer status block 536 to determine how much space is available in receive-frame-buffer RAM 535. The data from loop port circuit 20 are translated from sixteen bits wide to thirty-two bits wide and a flag bit is developed to indicate an SOF or EOF delimiter. The CRC from the received frame is passed through non-data-frame-buffer RAM 535 to protect the data. That is, the CRC information as received from the fibre channel is stored into the non-data-frame buffer 53 along with the data, and then is checked as the data are read out of the non-data-frame buffer 53 (e.g., as they are transferred to the off-chip buffer 111), in order that any errors that arise in the data as they reside in the non-data-frame buffer 53 can be detected (of course, errors that arose in the data in transit on the fibre channel loop 1250 are also detected). The input signals to block 53 include PRE-BUFFER-RECEIVE DATA 8511 and PRE-BUFFER-RECEIVE STATES 8512 (see FIG. 8), and registered (i.e., versions of signals that are clocked into a register for later use) MPU DATA 9533 and MPU ADDRESS 9534 from microprocessor 112.

Receive-frame-buffer read-control block 534 generates a read address (RPTR 9541) for the receive-frame-buffer RAM 535 and captures data (RDAT 9540) from the RAM 535. When frame-buffer controller 56 (see FIG. 7) selects the receive-non-data-frame buffer 53, a read to the receive-frame-buffer RAM 535 is enabled. The address is incremented and a wrap bit (WRAP 9542) is provided to be used by the receive-frame-buffer status block 536 to determine how much space is available in the receive-frame buffer RAM 535. The data from the receive-frame-buffer RAM 535 are captured into a register and monitored for the flag bit to determine the frame's start and end. An enable is developed to be used by the common receive path 59 (see FIG. 7) to indicate when data are valid. The input signals to block 534 include REGISTERED READ_ENABLE 9535 from microprocessor 112. The output signals from block 534 include RECEIVE NON-DATA BUFFER DATA 9543, and NON-DATA VALID READ 9546.

Receive-frame-buffer RAM 535 includes a synchronous RAM. The RAM is thirty-three bits wide (a thirty-two-bit data word plus an SOF/EOF flag bit) and three-hundred and four (304) words long. The SOF, header, payload, CRC, and EOF of a received non-data frame are written to the RAM 535 to be held until access to the off-chip buffer 111 and common receive path 59 is available. In one embodiment, a built-in self-test controller allows the receive-frame-buffer RAM 535 to be tested with data patterns developed specifically for the physical layout of the memory.

Receive-buffer-status block 536 compares the write and read pointers of the receive-frame-buffer RAM 535 to determine whether the buffer is empty and, if the buffer is not empty, how many frames of space are available in the receive-frame-buffer RAM 535. The outputs of this block 536 (AVAILABLE SPACE 9545) are used by the frame-buffer controller 56 to determine whether receive-frame-buffer RAM 535 requires access to the common receive path 59. The outputs are also used by the Buffer-to-Buffer Credit control logic 603 (see FIG. 12) to determine whether credit is available.

Receive-frame-buffer frame-counter block 531 counts the number of frames currently in the receive-frame-buffer RAM 535. The counter 531 is incremented when a frame is written into receive-frame-buffer RAM 535 and decremented when a frame is read from receive-frame-buffer RAM 535. The count (COUNT OF FRAMES IN BUFFER 9544) is used by the Buffer-to-Buffer Credit control 603 to determine whether credit is available. In one embodiment, all inputs (except the clock) going into the RAM are delayed, to provide adequate hold time.

Figure 10:
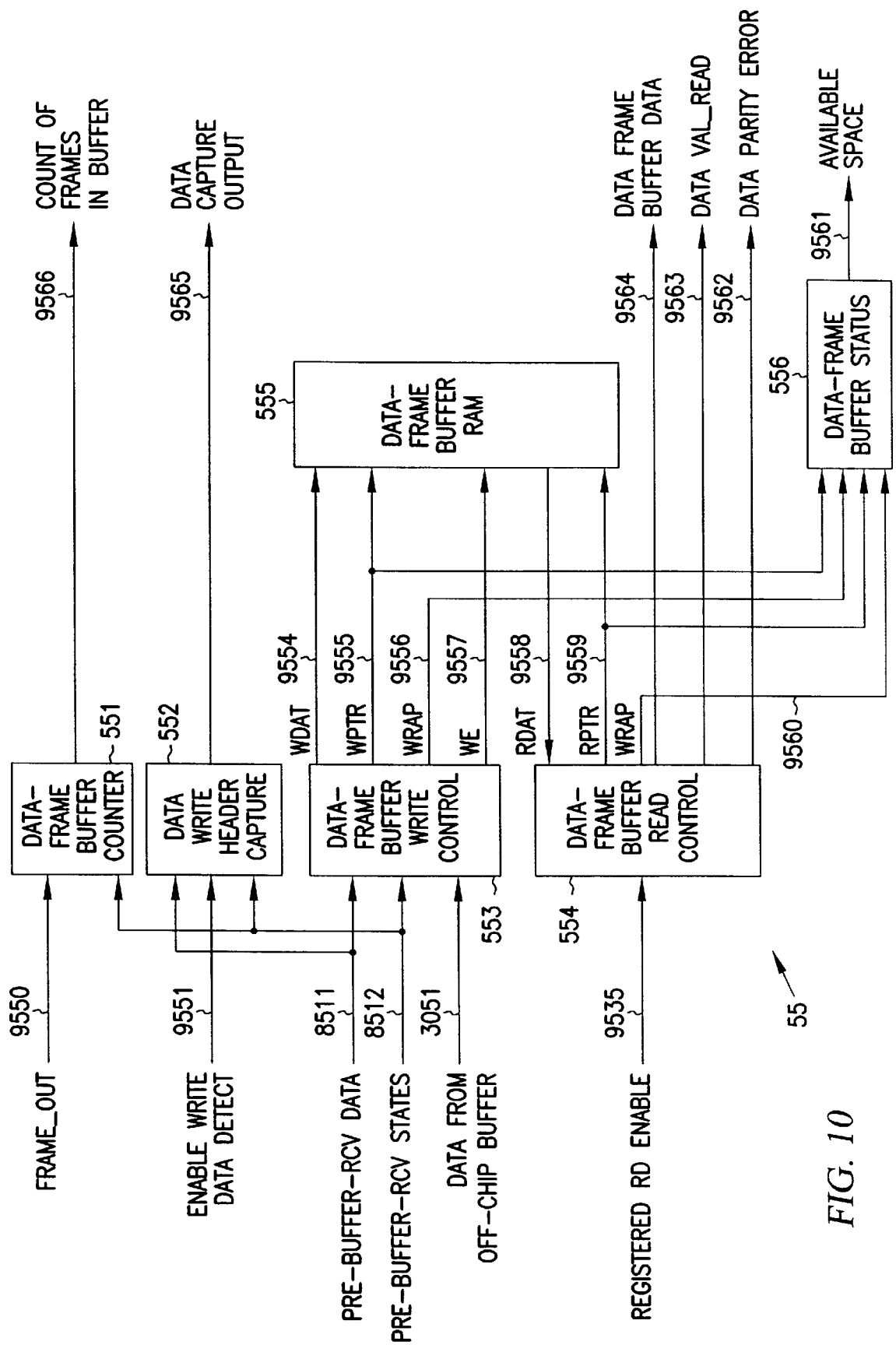
FIG. 10 is a block diagram of a fibre-channel data-frame buffer circuit 55.

FIG. 10 is a block diagram of a fibre-channel data-frame buffer circuit 55. Data-frame buffer 55 includes data-frame-buffer write control 553, data-frame-buffer read control 554, data-frame-buffer RAM 555, data-frame-buffer status block 556, data-frame-buffer frame counter 551, and data-frame-capture block 552. Only one data transfer is allowed at any given time, so data-frame buffer 55 is shared by Port A and Port B.

Data-frame-buffer write-control block 553 generates address (WPTR 9555), data (WDAT 9554), and write enables (WE 9557) for the data-frame-buffer RAM 555. For a write operation (data to be written to the disc), when a data frame is received, state enables from pre-buffer-receive state machine 512 are used to develop a write enable (WE 9557) to the memory 555. For a read operation (data to be read from the disc), enables from frame-buffer controller 56 are used to develop a write enable (WE 9557) to the memory 555. The address is incremented and a wrap bit (wrap 9556) is provided to be used by the data-frame-buffer status block 556 to determine how much data/space is available in data-frame-buffer RAM 555. For a write operation, the data from loop port circuit 20 are translated from sixteen bits wide to thirty-two bits wide and a flag bit is developed to indicate an SOF or EOF delimiter. The CRC from the received frame is passed through data-frame-buffer RAM 555 to protect the data. That is, the CRC information as received from the fibre channel is stored into the data-frame buffer 55 along with the data, and then is checked as the data are read out of the data-frame buffer 55 (e.g., as they are transferred to the off-chip buffer 111), in order that any errors that arise in the data as they reside in the data-frame buffer 55 can be detected (of course, errors that arose in the data in transit on the fibre channel loop 1250 are also detected). In one embodiment, for a read operation, the data from off-chip buffer 111 are translated (or converted) from sixteen bits wide to thirty-two bits wide and parity is generated to protect the data. The input signals to block 553 include PRE-BUFFER-RECEIVE DATA 8511 and PRE-BUFFER-RECEIVE STATES 8512 (see FIG. 8), and DATA FROM OFF-CHIP BUFFER 3051 (see FIG. 3).

Thus, in one embodiment, data in the data-frame-buffer RAM 555 are protected by CRC information if the data are passing from the fibre-channel loop 1250 (see FIG. 2) though data-frame-buffer RAM 555 and then to the off-chip buffer 111, but are protected by parity if they have passed from the off-chip buffer 111 to RAM 555 for transmission to the fibre-channel loop 1250 (in the latter case, CRC information is added to the data going onto the fibre channel after the data leave data-frame-buffer RAM 555).

Data-frame-buffer read-control block 554 generates a read address (RPTR 9559) for data-frame-buffer RAM 555 and captures data (RDAT 9558) from RAM 555. For a write operation (data to be written to the disc), the frame buffer controller 56 selects the data-frame buffer 55 and a read to the memory is enabled. For a read operation (data to be read from the disc), the transmit-frame state machine 81 (see FIG. 15) enables the read of the memory. The address is incremented and a wrap bit (WRAP 9560) is provided to be used by the data-frame buffer status block 556 to determine how much data/space is available in the frame buffer. For a write operation, the data from the frame buffer RAM are captured into a register and monitored for the flag bits to determine the frame's start and end, so that an enable can be developed for the common receive path 59 to indicate when data are valid. For a read operation, the data from data-frame-buffer RAM 555 are captured into a register and the parity is checked. The output signals from block 554 include DATA FRAME BUFFER DATA 9564, DATA VALID READ 9563, and DATA PARITY ERROR 9562.

Data-frame-buffer RAM 555 includes a synchronous RAM and, in one embodiment, a built-in self-test controller. In one embodiment, the RAM is thirty-six bits wide (a thirty-two-bit data word plus four SOF/EOF flag bits or parity bits) and 3,232 words long. For a write operation (data to be written to the disc), the SOF, header, payload, CRC, and EOF of a received data frame are written to the RAM 555 to be held until access to the off-chip buffer 111 and common receive path 59 is available. For a read operation (data to be read from the disc), the payload only is written to RAM 555 to be held until the loop 1250 can be opened and the data transmitted. In one embodiment, all inputs (except the clock) going into the RAM are delayed, to provide adequate hold time.

Data-frame-buffer status block 556 compares the write and read pointers of data-frame-buffer RAM 555 to determine whether the buffer is empty and, if the buffer is not empty, how many frames of data/space are available in the buffer. For a write operation, the outputs of this block 556 (AVAILABLE SPACE 9561) are used by the frame-buffer controller 56 to determine that the data-frame buffer 55 requires access to the common receive path 59. The outputs are also used by the Buffer-to-Buffer Credit control 603 (see FIG. 12) to determine whether credit is available. For a read operation (data to be read from the disc), the loop-control block 40 monitors the amount of data in the frame buffer to determine whether a frame can be transmitted. A data-frame-buffer threshold must be met to arbitrate to open the loop 1250. A data-frame-buffer-hold threshold is also generated to allow the loop 1250 to be held open in the event that a whole frame is not available but is in process (is being accumulated in data-frame buffer 55 and/or off-chip buffer 111).

Data-frame-buffer frame-counter block 551 counts the number of frames currently in data-frame-buffer RAM 555 using input signals FRAME_OUT 9550. Counter 551 is incremented when a frame is written into RAM 555 and decremented when a frame is read from RAM 555. The count (signal COUNT OF FRAMES IN BUFFER 9566) is used by the Buffer-to-Buffer Credit control 603 to determine whether credit is available.

Data-frame-capture block 552 monitors the received data frame (using input signal ENABLE DATA WRITE DETECT 9551) when the enable-capture mode is enabled and captures various fields of the frame header. These values (DATA CAPTURE OUTPUT 9565) may then be read by microprocessor 112.

Referring again to FIG. 7, data-frame-buffer transfer-length counters 54 control includes two counters that control how read data are prefetched into the data-frame buffer 55. A data-frame-buffer transfer-length counter (in block 54) is used to determine how much data should be fetched from the off-chip buffer 111 for a fibre-channel transfer. A data-frame-buffer transmit-length counter (in block 54) is used to determine how much data should be fetched from the off-chip buffer 111 before pausing for controller 56 to reevaluate which frame buffer should get access to the off-chip buffer 111 (a process described in the following paragraph).

Frame-buffer controller 56 determines which of the three frame buffers (i.e., data-frame buffer 55, port-A receive-non-data-frame buffer 53, or port-B receive-non-data-frame buffer 53') should be granted access to the resources of off-chip buffer 111. If a port is in a loop-initialization state and that port's receive-non-data-frame by the frame-buffer controller 56 to determine that the data-frame buffer 55 requires highest priority, so that loop initialization can progress. The data transfer is given the next-highest priority, and will continue as long as the receive-non-data-frame buffers 53 do not fill up. If one of the receive-non-data-frame buffers 53 no longer has room for a frame, that particular receive-non-data-frame buffer 53 will be granted access to the off-chip buffer 111 to drain some frames, and then the data transfer will be resumed.

The first frame buffer (55, 53 or 53') that requires the off-chip buffer resources will be granted access to the off-chip buffer 111. In the event both ports receive a frame at the same time, Port A will be given access first. Once the frame-buffer-control block 56 gives a frame buffer access to the off-chip buffer 111, it continues to service that frame buffer unless the alternate port's receive-non-data-frame buffer 53 fills, or initialization is started, or a data transfer is started. Frames on a given port will be transferred to the off-chip buffer 111 in order-of-delivery to the port.

The transfer of data between frame-buffer controller 56 and the off-chip buffer 111 may be paused by the buffer-control-interface logic 58 in the event that the data rate from the fibre channel cannot be sustained to off-chip buffer 111.

Figure 11:
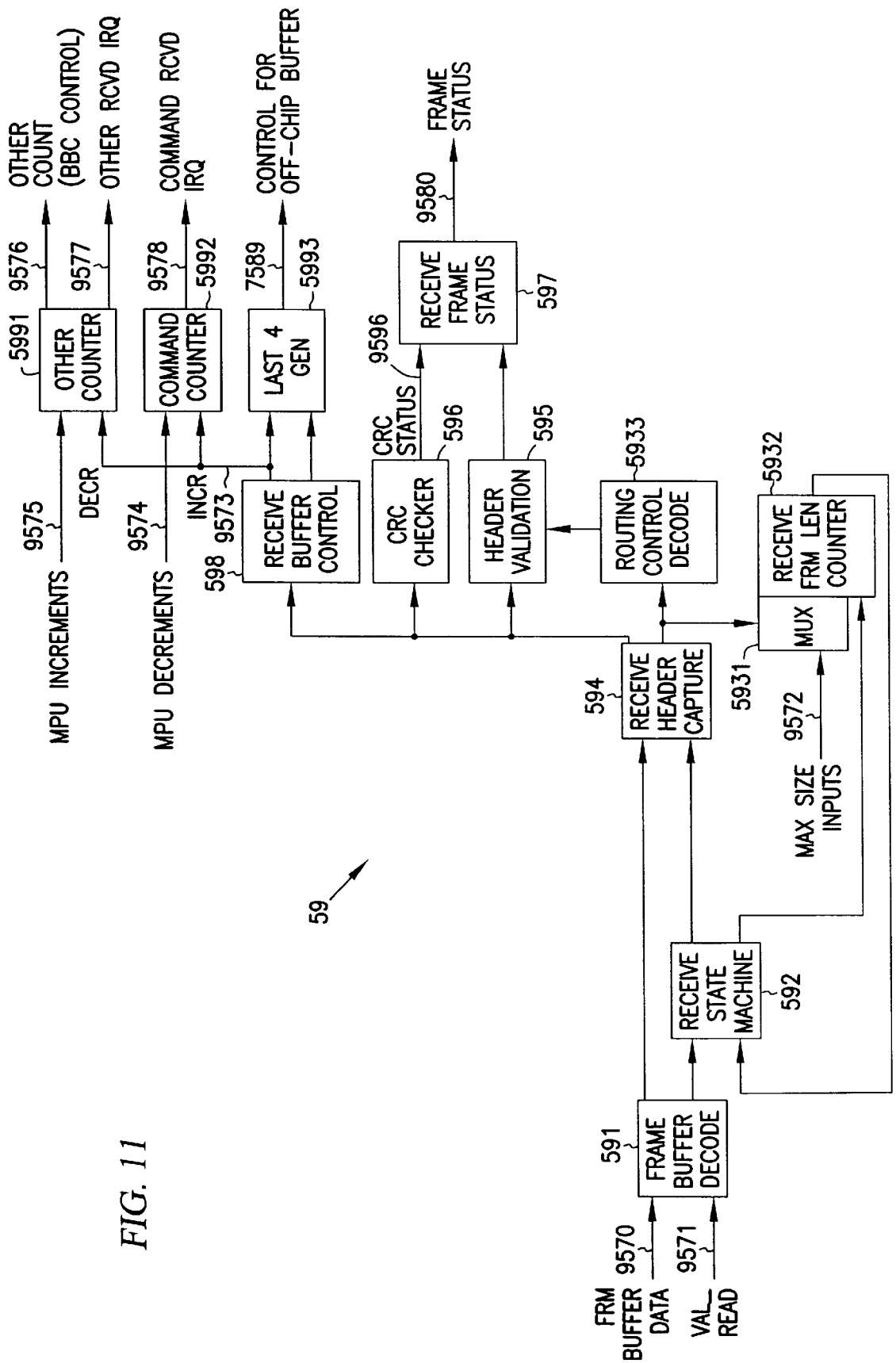
FIG. 11 is a block diagram of a fibre-channel common receive path circuit 59.

FIG. 11 is a block diagram of common receive path circuit 59, which takes the frame coming out of one of the frame buffers (53, 53', or 55) and prepares the frame for the off-chip buffer 111. This logic 59 recognizes the SOF and captures information from the received header for validation checking. The CRC is checked and the frame is routed to the appropriate buffer area of off-chip buffer 111.

Receive-buffer-decode block 591 decodes the start-of-frame and end-of-frame delimiters (derived from input data signal FRM BUFFER DATA 9570 and enable signal VAL_ READ 9571), and generates signals to be used by the common receive path 59 for frame-validity checks. The EOF delimiter may have error status (frame-length error or running-disparity error) embedded which is converted for the receive-path blocks.

Receive-framing state machine 592 monitors the input stream to determine frame boundaries. When an SOF is detected, signals are generated to allow each word of the header to be captured and to enable the CRC checker 596, header-validation controls 595, and buffer controls 598 (along with 5991, 5992, and 5993). State machine 592 checks for invalid primitives received during the header and for transfers that violate the maximum frame length allowed. Since the common receive path 59 can be paused temporarily, the state outputs of state machine 592 are pulses that go active and then inactive in order that the frame-capture-and-validation blocks are enabled properly.

Receive-framing length counter (mux 5931 and counter 5932) is loaded at the beginning of a frame with the maximum frame length of either the command, other, or data frame (from signals MAX SIZE INPUTS 9572), based on the R_CTL field from the header of the received frame. If the counter reaches zero before the EOF is detected, a frame-length error is detected and the frame is marked invalid. This function helps prevent overrunning the allocated space in the off-chip buffer 111 for the frame.

Receive-frame-header-capture block 594 uses the signals from the receive-framing state machine 592 to capture the various fields of a received header. The captured values are used by the frame-validation logic.

When a frame is received, CRC-checker block 596 checks the CRC at the end of the frame. If a CRC error is detected (indicated by CRC STATUS 9596), the frame is marked invalid. The CRC checker 596 is enabled by the receive-framing state machine 592. Contents of the header field, payload field, and CRC word are processed.

III. Using Fiber-Channel CRC for Data Integrity in On-Chip Memory

According to one aspect of the present invention, frame buffers that temporarily store fibre-channel frames allow frames to be received at the maximum fibre-channel-interface data-transfer rate. The frame may then be transferred to off-chip storage at a slower, more manageable rate. Various mechanisms, such as parity, CRC, or other redundancy functions, are optionally used to protect the data while they are being stored in the frame buffer.

In one embodiment, data-integrity checking is enhanced by passing the received fibre-channel cyclic-redundancy code ("CRC") through the frame buffers with the data (i.e., the CRC is stored into the frame buffer with the frame, and then read out with the frame at a later time), extra parity bits that would make the RAM wider may be eliminated. (In various embodiments, the frame buffer is data-frame buffer 55 and/or receive-non-data-frame buffer 53 or 53'). The CRC is checked after the data are read from the RAM and before they are transferred off-chip (i.e., to off-chip buffer 111). Extra parity bits on the inbound data paths can also be eliminated from the interface to the inbound side of the frame buffer and from the outbound side of the frame buffer to the input of the CRC checker 596.

Since the interface to the off-chip RAM handles only one transfer at-a-time and is slower than the on-chip RAMs and slower than the fibre-channel transfer rates, the common receive path logic 59 can be shared between the non-data-frame buffers 53 and 53', and the data-frame buffer 55. Only one CRC checker 596 is necessary, since the CRC is checked just before the frame goes off-chip (i.e., is transferred from the on-chip buffer 53, 53', or 55 to the off-chip buffer 111). In contrast, if the CRC were not stored in the frame buffers with the frame and then checked on the way to the off-chip buffer 111 (called "passing the CRC through the on-chip frame buffers"), two CRC checkers would be needed (i.e., placed within the pre-buffer paths 51 and 51').

In one embodiment, this mechanism is also used for the opposite direction, when data are transferred from the slower off-chip buffer 111, temporarily stored in a frame buffer, and transmitted at the maximum data-transfer rate on the fibre-channel interface.

When a frame is received, the R_CTL field is decoded by routing-control-decode block 5933 to determine the type of frame being received. The R_CTL field is used to route the frame to the appropriate area of the off-chip buffer 111, and to determine which validity checks are to be made on the frame.

Header-validation logic 595 analyzes the contents of the receive-frame header. Based on the R_CTL field of the frame, various fields are verified. If any of the validity checks fail on a non-data frame, the frame is considered invalid. If a validity check fails on a data frame when a data-write transfer is active, microprocessor 112 is notified.

Receive-frame-status block 597 gathers information about the received frame and blocks invalid data frames from going off-chip, and generates signal FRAME STATUS 9580. If a frame is not valid, it is essentially ignored (unless a data transfer is active).

Command counter 5992 is used to track how many command frames are contained in the command area of the off-chip buffer 111. When a valid command is received, this counter 5992 is incremented. When microprocessor 112 has finished with a command, it must decrement the command counter 5992 (using signal MPU DECREMENTS 9574 from microprocessor 112). Block 5992 outputs interrupt request CMD RCVD IRQ 9578.

"Other" space counter 5991 is used to track how much space remains in the "other" area of the off-chip buffer 111 (using signal MPU INCREMENTS 9575 from microprocessor 112), for giving out Buffer-to-Buffer Credit. This counter 5991 is decremented when a valid frame that is neither a command nor a data frame is received, or when a command frame is received when the off-chip buffer 111 is full. When microprocessor 112 has finished with a frame, it must increment the "other" space counter 5991 to indicate that there is space for another frame. The "other" space counter 5991 indicates (signal OTHER COUNT 9576, and interrupt request OTHER RCVD IRQ 9577) the number of frames with will fit in the "other" area of the off-chip buffer 111.

When a frame is received, receive-frame-buffer control 598 (which generates signals INCR/DECR 9573 to decrement other counter 5991 and increment command counter 5992) and last-4-generation logic 5993 generate signals (CONTROLS FOR OFF-CHIP BUFFER 7589) to the logic of off-chip buffer 111 to direct the frame to the proper area.

FIG. 12 is a block diagram of a fibre-channel transfer-control circuit 60, which includes control logic for the receive and transmit portions of the logic. Transfer-control circuit 60 includes transfer controls and Buffer-to-Buffer Credit control 603.

Data-available/space-counter block 604 provides an indication (DATA AVAILABLE 6019) of how much off-chip space or data is available, depending on whether the operation is a data-write or a data-read. On a data-write transfer, data-available/space-counter block 604 is used to indicate how much space is available (in terms of frames) in the data portion of the off-chip buffer 111 to allow BB_Credit to be issued. On a data-read transfer, data-available/space-counter block 604 is used to indicate how many data frames are available in the off-chip buffer 111. The difference in the buffer pointers is compared against microprocessor-loadable (i.e., programmable) values which indicate the number of words per frame(s).

Buffer-to-Buffer Credit control logic 603 issues buffer credit (signal PORT BB_CREDIT AVAILABLE TO TRANSMIT R_RDY 6017) to the connected port to allow frames to be sent. This credit is issued by sending R_RDY's. The amount of credit given to any port is determined by:

1) how much receive space is available in off-chip buffer 111 for disc drive 100
2) how much receive space is available in receive-non-data-frame buffer 53 and data-frame buffer 55 for disc drive 100
3) whether, given the credit, the port with which drive 100 is opened could potentially send frames that could occupy the available space The Buffer-to-Buffer Credit is determined on a per-port basis. The Buffer-to-Buffer Credit control block 603 generates signals to the loop-Port A/B open-control blocks 42 and 42' (see FIG. 6) to indicate when credit is available. The loop-control block 40 will then control the transmission of R_RDY's.

The remainder of transfer-control circuit 60 contains counters used during a transfer. Received-R_RDY counters

606 determine how many R_RDY's of credit have been received on each port from inputs PORT R_RDY RECEIVED 6010 (one each for Port A and Port B) and PORT FRAME TRANSMITTED 6011 (one each for Port A and Port B), and output signal PORT CREDIT AVAILABLE TO TRANSMIT A FRAME 6020. Transmitted-R_RDY counters 601 determine how many R_RDY's of credit have been transmitted on each port from inputs PORT R_RDY TRANSMITTED 6001 (one each for Port A and Port B) and PORT FRAME RECEIVED 6002 (one each for Port A and Port B). Sequence counter 607 is used on data-write transfers to check that received frames arrive in order and is used on data-read transfers to generate the SEQUENCE COUNT 6022 transmitted in the headers of data frames. Relative-offset counter 608 is used on data-read transfers to generate the RELATIVE-OFFSET COUNT 6023 transmitted in the headers of data frames. Transfer-length counter 609 is used to determine how much data to transfer and provides an indication (TRANSFER LENGTH COUNT 6024) when the transfer has completed.

Single-Frame-Transmit-Path Circuit 70

FIG. 13 is a block diagram of single-frame-transmit-path circuit 70 for a fibre channel. One embodiment of the present invention provides a fibre-channel-loop-interface circuit which includes a dedicated transmit-frame buffer 73 for loop initialization and responses. Having such a dedicated transmit-frame buffer 73 allows one port of a dual-port node to be transmitting initialization or response frames while another port is transmitting or receiving (i.e., "communicating") data frames. If a loop experiences loss-of-sync or other problems, the loop 1250 must be re-initialized, and the dedicated transmit-frame buffer 73 allows this function to occur without disrupting a data transfer or other function that could be in progress on the other loop connected to the other port of the dual-port node interface. Both ports can be simultaneously initialized as well. Further, this dedicated transmit-frame buffer 73 allows responses, acknowledgments, or other non-data transfers to be transmitted out of one port while the other port is in use. Thus, single-frame-transmit-path circuit 70 in conjunction with microprocessor 112 operates to provide loop-initialization and response functions for node interface 1220. Transmit-frame buffer 73 accepts inputs MPU LOADABLE 7002 (data from microprocessor 112), RECEIVE PATH DATA 7003 and RECEIVE PATH CONTROLS 7004 (frames from the receive path 50). Transmit-frame buffer 73 generates outputs MPU READ DATA 3095, and, through blocks 74 and 76, XMT_DPTH DATA 7007 (outbound frames including CRC which are to be transmitted).

The single-frame-transmit-path circuit 70 accepts requests from the loop-control circuit 40 to transmit frames which reside in the single-frame transmit-frame buffer 73. This circuit 70 generates the proper frame delimiter, reads the header and payload from the frame buffer, and generates the proper CRC with CRC generator 76. This circuit 70 also generates signals to the loop port circuit 20 for transmitting the current-fill-word and to indicate when the end-of-frame ("EOF") is being transferred, to allow the encoder to generate the second character of the EOF based on the current running disparity.

Single-frame-transmit state machine 72 accepts requests (via signal SEND_FRAME 7001) from the loop-control circuit 40 to transmit a frame. When a frame is transmitted, this state machine 72 provides selects (i.e., select signals) for each portion of the frame sent to the transmit multiplexer 74, in order to allow the frame delimiters, header, and payload to be transferred at the proper times. This state machine 72 also generates enables to the CRC generator 76. Control is also provided to the 8B/10B encoder 27 (see FIG. 4) to determine when to transmit the EOF signal. When a frame has been transmitted, signals are generated and sent back to loop-control circuit 40 to allow it to continue operation.

Single-frame-transmit frame-length counter 71 is used to allow the hardware to determine how long the frame is, in order to allow the final CRC to be output at the appropriate time (the CRC is repeatedly calculated one-word-at-a-time and accumulated as the data portion of the frame is output). Counter 71 is loaded at the beginning of the frame from a transmit-frame-length register and enabled while the frame is being transmitted. Counter 71 is enabled by single-frame-transmit state machine 72 and provides status (i.e., status information) back to state machine 72 to determine when to enable CRC generator 76.

The output of single-frame-transmit output multiplexer 74 is an input to the CRC generator 76 to determine the CRC residual word included before the EOF, which feeds through multiplexer 79 to loop-port circuit 20 (see FIG. 3). The single-frame-transmit state machine 72 generates the selects for this multiplexer 74 to allow the frame delimiters, header, and payload to be transferred at the proper times.

Single-transmit-fill-character generator block 75 determines when a K-character, current-fill-word, and EOF delimiters are transmitting from the single-frame-transmit circuit 70. The output signals XMIT CONTROLS 7010 go to the transmit-path multiplexer 79 which determines which loop has access to the single-frame-transmit-path circuit 70.

FIG. 14 is a block diagram of a fibre-channel transmit-frame buffer 73. In this embodiment, a single-frame transmit-frame buffer 73 includes single-frame-buffer write control 733, single-frame-buffer read control 734, and single-frame-transmit-frame buffer RAM 735. Single-frame transmit-frame buffer 73 is used to store received loop-initialization frames, outbound loop-initialization frames, and outbound single frames. Forty words of transmit buffer RAM 735 are reserved for Port A and forty are reserved for Port B, in one embodiment.

Single-frame-buffer write-control block 733 generates address (WPTR 1411), data (WDAT 1410), and write enables (WE 1412) for single-frame-buffer RAM 735. The inputs include DATA FROM RECEIVE PATH 1401, PORT A FRAME 1403, PORT B FRAME 1404, registered MPU DATA 9533, and registered MPU ADDRESS 9534. When a loop-initialization frame is received, the frame is first stored in one of receive-non-data-frame buffers (53 or 53') until it can move through the common receive path 59 for validation. Rather than transferring the frame to the off-chip buffer 111, the frame is written into single-frame transmit-frame buffer 73. This also allows the off-chip buffer 111 to be more dedicated to a data transfer on the alternate port. The data from the loop port are translated from sixteen bits wide to thirty-two bits wide and the starting address of the frame is determined on the basis of the port with which the frame is associated.

Microprocessor 112 also may write to single-frame transmit-frame buffer 73 to modify a loop-initialization frame or to set up an outbound frame. Parity is generated to protect the data in single-frame transmit-frame buffer 73.

Single-frame-transmit-buffer read-control block 734 generates a read address (RPTR 1414) for the single-frame-transmit buffer RAM 735 and captures data (RDAT 1413) from the RAM 735. Inputs include SEND FRAME 1407 and XMIT STATES 1408. When the single-framing state machine 72 enables a frame for transmission, a read of the single-frame-transmit buffer RAM 735 is enabled (outputting SINGLE_FRAME TRANSMIT BUFFER DATA 1415). Microprocessor 112 may also read this frame buffer to access a received loop-initialization frame. The data from the transmit-frame buffer RAM 735 are captured into a register and parity is checked (generating output PARITY ERROR 1416).

Single-frame-transmit buffer RAM 735 includes a synchronous RAM and, in one embodiment, a built-in self-test controller. The RAM is thirty-six bits wide (a thirty-two-bit data word plus four bits of parity) and eighty locations long. The header and payload of a frame are placed into transmit-frame buffer RAM 735 to be held for microprocessor 112 to examine or for transmission on the loop 1250. In one embodiment, all inputs (except the clock) going into the RAM are delayed, to provide adequate hold time.

Figure 15:
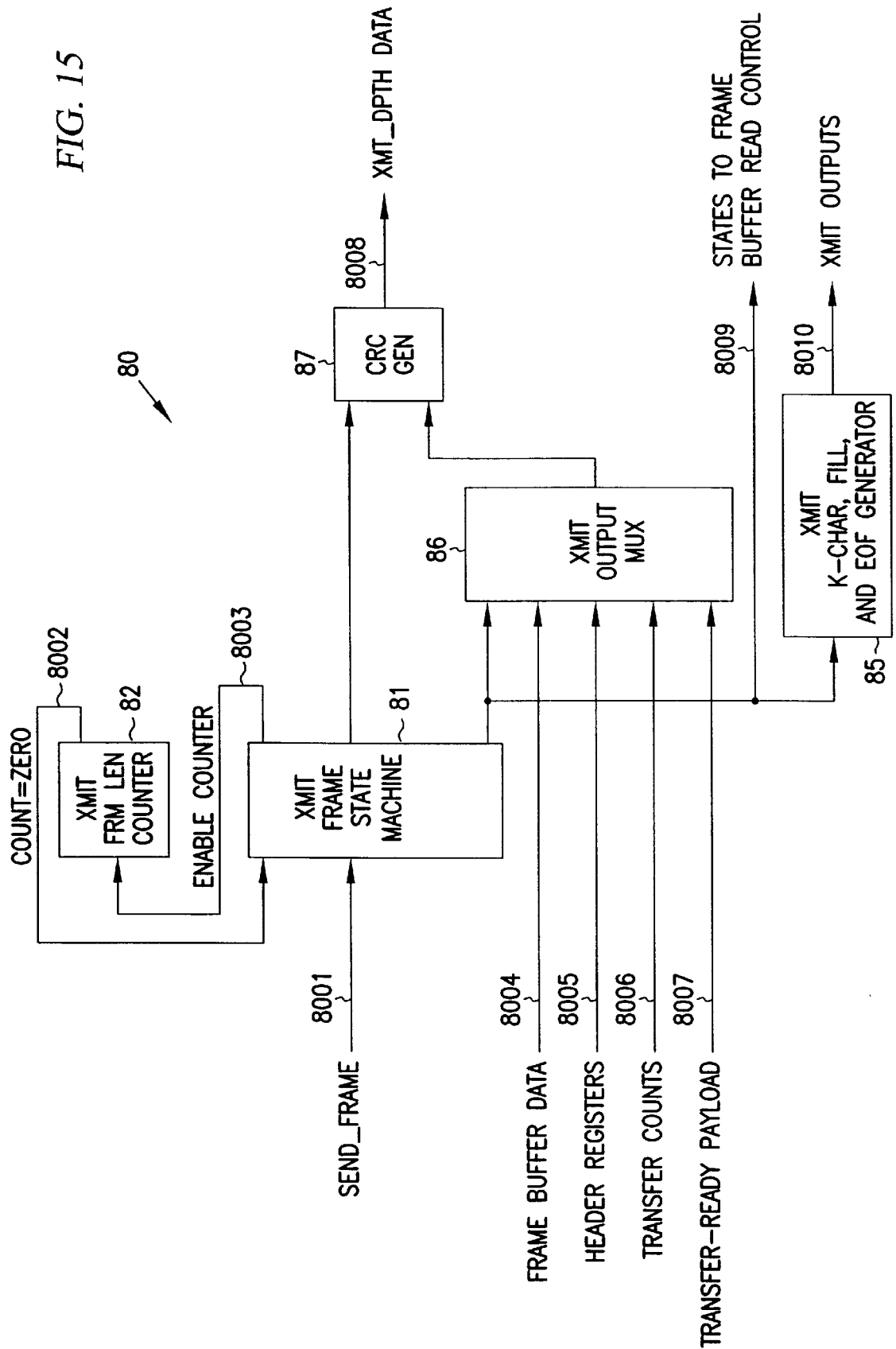
FIG. 15 is a block diagram of a block diagram of a fibre-channel data transmit path circuit 80.

FIG. 15 is a block diagram of data transmit path circuit 80, which accepts requests from the loop-control logic 40 to transmit frames. Circuit 80 generates the proper frame delimiter, builds the header from the microprocessor-loadable registers, and generates the CRC. Circuit 80 also generates signals to the loop port circuit 20 for transmitting the current-fill-word and to indicate when the EOF is being transferred, to allow the encoder to generate the second character of the EOF based on the current running disparity.

Data-transmit-framing state machine 81 accepts requests (signal SEND-FRAME 8001) from the loop-control logic 40 to transmit a frame. When a frame is transmitted, this state machine 81 provides selects for each portion of the frame to transmit multiplexer 86 to allow the frame delimiters, header, and payload to be transferred at the proper times. State machine 81 also generates enables to the CRC generator 87. When a frame has been transmitted, signals are generated back to the loop-control logic 40 to allow it to continue.

Data-transmit frame-length counter 82 is used to allow the hardware to determine how long the frame is, to allow the CRC to be generated at the appropriate time. Data-transmit frame-length counter 82 is loaded at the beginning of the frame from the transmit-frame length-register and enabled while the frame is being transmitted. Data-transmit frame-length counter 82 is enabled by the transmit-framing state machine 81 and provides status back to the state machine to determine when to enable the CRC generator 87.

The output of data-frame-transmit output multiplexer 86 is an input to the CRC generator 87 which feeds the data transmit path multiplexer 79. The data transmit framing state machine 81 generates the selects for this multiplexer 86 to allow the frame delimiters, header, and payload to be transferred at the proper times. The inputs include FRAME BUFFER DATA 8004, HEADER REGISTERS 8005, TRANSFER COUNTS 8006, and TRANSFER-READY PAYLOAD 8007. The outputs include STATES TO FRAME BUFFER READ CONTROL 8009. A delimiter generator in multiplexer 86 determines which start-of-frame (SOF) and end-of-frame (EOF) primitive to use when transmitting frames.

The output of the data-frame-transmit-output multiplexer 86 is transferred through the CRC generator 87 to determine the CRC residual word included before the EOF. Enables for CRC generator 87 come from the data-transmit-framing state machine 81. Control is also provided to the 8B/10B encoder 27 (see FIG. 4) to determine when to transmit the EOF signal. The output of CRC generator 87 is XMT_DPTH DATA 8008 (outbound frames including CRC which are to be transmitted).

Data Transfer Fill Character block 85 determines when a K-character, current-fill-word, and EOF delimiters are transmitting from the data transmit path circuit 80. The output signals XMIT OUTPUTS 8010 go to transmit path multiplexer 79 which determines which loop has access to the data transmit path circuit 80.

The output of transmit-path multiplexer 79 (see FIG. 3) is an input to the Port-A and Port-B arbitrated-loop logic 26 within loop-port circuit 20. The data and control signals from the single-frame path 70 and data path 80 are selected by transmit-path multiplexer 79 to the proper port. Transmit-path multiplexer 79 also multiplexes the R_RDY primitive to the ports. This allows both ports to transmit simultaneously.

IV. Method and Apparatus to Reduce Arbitrated-Loop Overhead

In a fibre-channel arbitrated-loop design 1200, a node interface 1220 of loop port 116 must arbitrate for access to the loop 1250. A priority system is used to determine which port gains control of the loop 1250, and a "fairness" scheme is used to assure that ports are not starved. As a target device, the disc drive 100 usually is given a lower priority than a CPU 1202, with the result that the drive 100 may have to wait to win arbitration until higher-priority devices complete their access. When the node interface 1220 of loop port 116 gains control of the loop 1250, it sends as many frames as possible before closing the loop 1250, in order to avoid unnecessary arbitration cycles. But when data are no longer available, the node interface 1220 of loop port 116 closes the loop 1250 to allow other ports access to the loop 1250. This is the method used in certain other controller architectures. The present invention provides a mechanism for enhancing loop performance by changing the rules for the decision of whether or not to close the loop 1250, based on data availability to the port, which thus reduces overall loop overhead.

In certain other controller architectures, when the End-of-Frame delimiter is transmitted, the port determines whether another frame is available. If data are no longer available (for example, if a full frame is not available for transmission), then the loop 1250 is closed. Data may again become available shortly afterwards, so the port must arbitrate again later and win arbitration before continuing the transfer. If this happens as the last frame of the transfer becomes available, completion of the transfer is delayed, which may result in a delay before the next command can be processed.

The present invention provides a mechanism for controller architecture designs which allows the loop 1250 to be held open by a port if data will shortly be available to the port. This may reduce the number of times a node interface 1220 of loop port 116 must arbitrate during an outgoing data transfer, and may thus allow transfers to complete sooner. In one embodiment, the loop 1250 is held open in anticipation of sufficient further data becoming available to a port (to justify that port's retaining control of the loop) when both of the following conditions are met:

at least X-frames are available off-chip, and at least Y-words of data are available in the data-frame buffer 55. In one such embodiment, the value of X (where X represents the number of frames which need to be available in the off-chip buffer 111 in order to keep the loop 1250 held open) and the value for Y (where Y represents the number of words which need to be available in the on-chip buffer in order to keep the loop 1250 held open) are each separately programmable (e.g., by firmware code via microprocessor 112). In another embodiment, the loop 1250 is held open when a predetermined amount of data (not necessarily specified as a number of frames) is available in the off-chip buffer 111 (in one such embodiment, the predetermined amount of data required to be available in the off-chip buffer 111 is programmable). In another embodiment, the loop 1250 is held open when a predetermined amount of data (not necessarily specified as a number of words) is available in the on-chip buffer 119 (in one such embodiment, the predetermined amount of data required to be available in the on-chip buffer 119 is programmable). In one embodiment, the loop 1250 is held open if the predetermined amount of data is available (at least one-half frame on-chip and at least one frame available off-chip), but the transfer of a frame will not start until an entire frame is available on-chip.

For example, in one embodiment, the on-chip data-frame buffer 55 is large enough to hold at least six frames of data (i.e., six frames of the maximum frame size of 2112 bytes). Data that are being transmitted are first moved into off-chip buffer 111 (e.g., from a disk platter 134), and then into on-chip data-frame buffer 55. Typically, data can be transferred out of data-frame buffer 55 at up to about one-hundred-and-six megabytes per second, while, in one embodiment, the transfer from off-chip buffer 111 to on-chip data-frame buffer 55 occurs at a slower rate. If less than a full frame is already moved into on-chip data-frame buffer 55, it may still be possible to start a frame transfer and complete transfer of the entire frame out at the full fibre-channel speed of (about) one-hundred-and-six megabytes per second, as long as the last portion of the frame is moved into the on-chip data-frame buffer 55 before those data are needed for transfer out.

Thus, according to one embodiment the present invention, the loop 1250 is held open if at least one-half a frame of data is contained in on-chip data-frame buffer 55, and at least one frame of data are contained in off-chip buffer 111. In one such embodiment, this amount of data needed to keep control of the loop 1250 (to "hold the loop open") is about one-thousand bytes of data in on-chip buffer 55 (i.e., one-half of a 2,112-byte frame), and about two-thousand bytes of data in off-chip buffer 111 (i.e., one 2,112-byte frame), both amounts being programmable values that are set by microprocessor 112. In one embodiment, the loop 1250 is held open if the predetermined amount of data is available, as just described, but the transfer of a frame will start only after an entire frame is available on-chip; in one such embodiment, CFW (current-fill word) signals are transmitted onto the loop 1250 until the entire frame is on-chip and transmission of the frame can start.

A count of the number of frames available to transfer out is produced by the controller in off-chip buffer 111 of one embodiment of the present invention. A firmware-programmable count X-frames (the number of frames needed in off-chip buffer 111 to keep the loop open), is compared against the count of the number of frames available to transfer, in order to determine whether data are available to transfer into the data-frame buffer. The data-frame buffer is an on-chip RAM that is used to temporarily store data from off-chip slower memory, so that the data can be transmitted at the full fibre-channel interface rate. A second comparator is used to compare the amount of data available within the data-frame buffer against a firmware programmable count, Y-words (the number of words needed in on-chip buffer 55 to keep the loop open), to determine whether sufficient data are already in the data-frame buffer to hold the loop 1250 open. The values of X and Y are firmware programmable to allow this logic to be used with a variety of off-chip random access memory ("RAM") solutions and transfer rates.

One goal of the present invention is to hold the loop 1250 open and avoid an extra arbitration cycle when data will shortly be available to a port 116. The loop 1250 must not be held open waiting for data to become available if the wait will be for an extended period of time (for example, for the time required to perform a head switch), since this would prevent other ports on the loop 1250 from performing transfers.

Conclusion

A fibre-channel loop interface circuit (110) has been described that includes a dedicated transmit-frame buffer (73) for loop initialization and responses. Having such a dedicated transmit-frame buffer (73) allows one port (116) of a dual-port node (1220) to be transmitting initialization or response frames while another port (116) is transmitting or receiving data frames. Dedicated receive buffers (53 and 55) are also provided for each port (116) of a two-port node (1220). Cyclic-redundancy code information received from the fibre-channel (1250) along with a frame is stored in one of the three frame buffers (53, 53' or 55). These data and CRC are later checked to ensure the integrity of the data while in the frame buffer (53, 53' or 55). Control of a loop is maintained (i.e., the loop connection is held open) as long as a minimum amount of data, which optionally is determined by programming (called a "programmable amount of data"), is available for transmission, in order to reduce the overall amount of time spent arbitrating for control of the loop (1250).

In one embodiment, the present invention provides an improved communications channel system (1200) that includes a first channel node (1220) having a first port (116) and a second port (116). Each port (116) supports a fibre-channel arbitrated-loop serial communications channel (1250). The system also includes a dedicated frame buffer (119) within the first channel node (1220) for loop initialization and responses. The dedicated frame buffer (119) includes various specialized component frame buffers.

In one such embodiment, the dedicated frame buffer (119) is configured as an on-chip buffer and includes: a first inbound non-data buffer (53) operatively coupled to a first port (116), a second inbound non-data buffer (53') operatively coupled to a second port (116), a data-frame buffer (55) operatively coupled to both the first port (116) and the second port (116), and an outbound transmit-frame buffer (73) operatively coupled to at least one of the first and second ports (116). Optionally, the system further includes a loop-initialization circuit (implemented by blocks 70 and 112 in conjunction) that performs loop initialization substantially simultaneously on both the first port (116) and the second port (116), using data in the outbound transmit-frame buffer (73).

In one embodiment, the dedicated frame buffer (119) includes a dedicated transmit-frame buffer (73) having about eighty words of data. In another embodiment, the dedicated frame buffer (119) includes a dedicated transmit-frame buffer (73) operatively coupled to at least one of the first and second ports (116) for loop initialization and responses (wherein the non-data frame includes information selected from loop-initialization and response information). In one embodiment, the transmit-frame buffer (73) transmits loop initialization or responses on a first port (116), while substantially simultaneously a second port (116) communicates ( i.e., transmits or receives) data.

In one such embodiment, the system further includes a loop-initialization circuit (implemented by blocks 70 and 112 in conjunction) that performs loop initialization substantially simultaneously on both the first port and the second port using data in the transmit-frame buffer (73). (In one such embodiment, transit-frame buffer (73) is implemented with independent portions for each or two ports (116) so that loop initialization and responses can be sent simultaneously. In another such embodiment, a single transmit-frame buffer (73) is shared by two ports (116) so that loop initialization and responses can be sent sequentially close to one another in time on the two ports (116), but not quite simultaneously.)

In one embodiment, the dedicated frame buffer (119) is configured as an on-chip buffer and includes a dedicated transmit-frame buffer (73) operatively coupled to at least one of the first and second ports (116) for loop initialization and responses. In one embodiment, the system (1200) reserves about half of the buffer's space for a first port and another half of the buffer's space for a second port. In one such embodiment, the dedicated transmit-frame buffer (73) is operatively coupled to both ports and further includes a loop-initialization circuit (implemented by blocks 70 and 112 in conjunction) that performs loop initialization substantially simultaneously on both the first port and the second port using data in the transmit-frame buffer (73).

Optionally, any of these system embodiments further includes a magnetic-disc-storage drive (1256) operatively coupled to the first channel node (1220), and a computer system (1202) having a second channel node (1220), wherein the second channel node (1220) is operatively coupled to the first channel node (1220) in a fibre-channel loop in order to transfer data between the first and second channel nodes through the fibre-channel arbitrated-loop serial communications channel (1250).

Another aspect of the present invention provides a disc drive (100). Disc drive (100) includes a rotatable disc (134), a transducer (150) in transducing relationship to the rotating disc (134), and a first channel node (1220) having a first port (116) and a second port (116), each port (116) supporting a fibre-channel arbitrated-loop serial communications channel (1250). The first channel node is operatively coupled to the transducer. Disc drive (100) further includes a dedicated transmit-frame buffer (73) within the first channel node that operates to transmit a non-data frame, wherein the non-data frame includes information selected from loop-initialization and response information, and wherein the transmit-frame buffer (73) transmits the non-data frame on the first port (116), while substantially simultaneously the second port (116) communicates data.

Yet another aspect of the present invention provides a method that includes:
(a) supporting a fibre-channel arbitrated-loop serial communications channel on each of a first port and a second port of a first channel node;
(b) implementing a dedicated frame buffer in the first channel node;
(c) receiving frames to the dedicated frame buffer; and
(d) transmitting frames from the dedicated frame buffer for loop initialization and responses.
In one embodiment of the method, the implementing step (b) further includes:
(b)(i) implementing a dedicated transmit-frame buffer in the dedicated frame buffer; and
(b)(ii) operatively coupling the dedicated transmit-frame buffer to at least one of the first and second ports;
and the transmitting step (d) further includes
(d)(i) transmitting loop-initialization and response frames from the transmit-frame buffer.

In one such embodiment of the method, the transmitting step (d) further includes
(d)(ii) communicating data substantially simultaneously on the second port while transmitting frames on the first port.
In another such embodiment of the method, the transmitting step (d) further includes
(d)(iii) transmitting loop-initialization frames substantially simultaneously on both the first port and the second port using data in the transmit-frame buffer.
In another embodiment of the method, the implementing step (b) further includes:
(b)(iii) implementing a first inbound non-data buffer operatively coupled to the first port,
(b)(iv) implementing a second inbound non-data buffer operatively coupled to the second port,
(b)(v) implementing a data-frame buffer operatively coupled to both the first port and the second port, and
(b)(vi) implementing a dedicated transmit-frame buffer;
the receiving step (c) further includes:
(c)(i) receiving non-data frames to the first inbound non-data buffer and the second inbound non-data buffer,
(c)(ii) receiving data frames to data-frame buffer; and the transmitting step (d) further includes
(d)(iv) transmitting non-data frames from the transmit-frame buffer.
In one such embodiment of the method, the transmitting step (d) further includes
(d)(v) performing loop initialization substantially simultaneously on both the first port and the second port using data in the dedicated transit-frame buffer.
In yet another embodiment of the method, the implementing step (b) further includes:
(b)(iii) configuring the dedicated frame buffer as an on-chip buffer that includes a dedicated on-chip transmit-frame buffer, and
(b)(iv) operatively coupling the on-chip transmit-frame buffer to at least one of the first and second ports; and the transmitting step (d) further includes
(d)(vi) transmitting loop-initialization and response frames from the on-chip transmit-frame buffer.
In one such embodiment of the method, the implementing step (b) further includes
(b)(v) operatively coupling the dedicated transmit-frame buffer to both ports; and
the transmitting step (d) further includes
(d)(vii) transmitting loop-initialization frames substantially simultaneously on both the first port and the second port using data in the transmit-frame buffer.
In some embodiments, the transmitting step (d) of any of the above method embodiments optionally includes
(d)(viii) transferring data through the fibre-channel arbitrated-loop serial communications channel between a magnetic-disc-storage drive that is operatively coupled to the first channel node and a computer system having a second channel node, wherein the second channel node is operatively coupled to the first channel node by the fibre-channel arbitrated-loop serial-communications channel.

Still another aspect of the present invention provides a communications channel system (1200) that includes a first channel-node (1220) having a first port (116) and a second port (116), each port (116) supporting a fibre-channel arbitrated-loop serial communications channel (1250). This system also includes a dedicated frame buffer mechanism for receiving and transmitting frames. Such mechanisms are defined as those described above for FIGS. 1 through 15, and equivalents thereto.

Thus, the present invention provides a significant performance enhancement by allowing transmission of loop-initialization frames and/or response frames from a dedicated transmit buffer (73) that is operable to transmit on either or both outbound fibres (118) of a dual-port fibre-channel interface node (1220). In some embodiments, such transmission is performed even while the node (1220) is simultaneously receiving a data frame on one of the inbound fibres (117) and/or receiving a non-data frame on one or both of the inbound fibres (117). That is, transmitting on one fibre (118) of a port is optionally performed simultaneously with receiving on the other fibre (117) of the same port.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A communications channel system comprising:
a first channel node having a first port and a second port, each port supporting a serial communications channel; and
a dedicated frame buffer communicatively coupled to the first port and the second port, that transmits loop initialization data and responses through the serial communications channel, the dedicated frame buffer being configured as an on-chip buffer and including:
a first inbound non-data buffer operatively coupled to the first port;
a second inbound non-data buffer operatively coupled to the second port;
a data-frame buffer operatively coupled to both the first port and the second port; and
an outbound transmit-frame buffer operatively coupled to at least one of the first and second ports.

2. The system according to claim 1, further comprising:
a loop-initialization circuit that performs loop initialization substantially simultaneously on both the first port and the second port using data in the outbound transmit-frame buffer.

3. The system according to claim 1, wherein loop initialization is accomplished by transmitting a sequence of one or more specialized non-data frames from the outbound transit-frame buffer the first port, while simultaneously transmitting data frames from the data-frame buffer to the second port.

4. The communications channel system according to claim 1, wherein the serial communication channel further comprises a fibre-channel arbitrated-loop serial communications channel.

5. A communications channel system comprising:
a first channel node having a first port and a second port, each port supporting a serial communications channel; and
a dedicated frame buffer communicatively coupled to the first port and the second port, that transmits loop initialization data and responses through the serial communications channel, the dedicated frame buffer including:
a dedicated transmit-frame buffer within the first channel node that operates to transmit a non-data frame to at least one of the first and second ports, wherein the non-data frame includes information selected from loop-initialization and response information.

6. The system according to claim 5, wherein the transmit-frame buffer transmits the non-data frame on the first port, while substantially simultaneously the second port communicates data.

7. The system according to claim 5, further comprising:
a loop-initialization circuit that performs loop initialization substantially simultaneously on both the first port and the second port using data in the transmit-frame buffer.

8. A communications channel system comprising:
a first channel node having a first port and a second port, each port supporting a serial communications channel; and
a dedicated frame buffer communicatively coupled to the first port and the second port, that transmits loop initialization data and responses through the serial communications channel, the dedicated frame buffer being configures as an on-chip buffer and including:
a dedicated transmit-frame buffer operatively coupled to at least one of the first and second ports for loop initialization and responses.

9. The system according to claim 8, wherein loop initialization is accomplished by transmitting a sequence of one or more specialized non-data frames and monitoring in the node responses to those frames.

10. The communications channel system according to claim 8, wherein the serial communication channel further comprises a fibre-channel arbitrated-loop serial communications channel.

11. The system according to claim 8, wherein the dedicated transmit-frame buffer is operatively coupled to both ports and further comprising:
a loop-initialization circuit that performs loop initialization substantially simultaneously on both the first port and the second port using data in the transmit-frame buffer.

12. The system according to claim 11, further comprising:
a magnetic-disc-storage drive operatively coupled to the first channel node; and
a computer system having a second channel node, wherein the second channel node is operatively coupled to the first channel node in a serial communications loop in order to transfer data between the first and second channel nodes through the serial communications channel.

13. A communications channel system comprising:
a first channel node having a first port and a second port, each port supporting a serial communications channel; and
a dedicated frame buffer communicatively coupled to the first port and the second port, that transmits loop initialization data and responses through the serial communications channel,
a loop initialization circuit that generates loop initialization and response data, the circuit operatively coupled to the dedicated frame buffer, wherein the loop initialization data is transmitted from the first channel node to another node on one of the channel connected to the first port and the channel connected to the second port, and wherein the responses are non-data frames sent by the first channel node in response to commands or inquiries from other nodes.

14. A data storage device comprising:

a data storage medium;

a communicating module operable to communicate data to the data storage medium;

a first channel node having a first port and a second port, each port supporting a serial communications channel, the first channel node operatively coupled to the communicating module; and a dedicated transmit-frame buffer within the first channel node that operates to transmit a non-data frame, wherein the non-data frame includes information selected from loop-initialization and response information, and wherein the transmit-frame buffer transmits the non-data frame to another device on the serial communications channel connected to the first port, while substantially simultaneously the second port communicates data.

15. The data storage device according to claim 14, wherein the first port and the second port are configured to support a fibre-channel arbitrated-loop serial communications channel.

16. A communications channel method comprising steps of:

(a) supporting a serial communications channel on each of a first port and a second port of a first channel node;

(b) implementing a dedicated frame buffer in the first channel node;

(b)(i) implementing a dedicated transmit-frame buffer in the dedicated frame buffer;

(b)(ii) operatively coupling the dedicated transmit-frame buffer to at least one of the first and second ports; and (c) transmitting loop-initialization data and response frames from the dedicated frame buffer through the serial communications channel, wherein the transmitting step (c) further comprises a step of (c)(i) transmitting the loop-initialization and response frames from the dedicated transmit-frame buffer.

17. The method according to claim 16, wherein the transmitting step (c) further comprises a step of (c)(ii) communicating data substantially simultaneously on the second port while transmitting loop-initialization data and response frames on the first port.

18. The method according to claim 16, wherein the transmitting step (c) further comprises a step of (c)(iii) transmitting loop-initialization frames substantially simultaneously on both the first port and the second port using data in the transmit-frame buffer.

19. The method according to claim 16, wherein the step (c)(i) further comprises transmitting the loop-initialization and response frames from the dedicated transmit-frame buffer to another node on one of (A) the channel connected to the first port and (B) the channel connected to the second port.

20. The method according to claim 16, wherein the implementing step (b) further comprises steps of:

(b)(iii) implementing a first inbound non-data buffer operatively coupled to the first port, (b)(iv) implementing a second inbound non-data buffer operatively coupled to the second port, (b)(v) implementing a data-frame buffer operatively coupled to both the first port and the second port, and (b)(vi) implementing a dedicated transmit-frame buffer, wherein the method further includes steps of:

(d)(i) receiving non-data frames to the first inbound non-data buffer and the second inbound non-data buffer, (d)(ii) receiving data frames to data frame buffer; and wherein the transmitting step (c) further comprises a step of (c)(iv) transmitting non-data frames from the transmit-frame buffer.

21. The method according to claim 20 wherein the transmitting step (c) further comprises a step of (c)(v) performing loop initialization substantially simultaneously on both the first port and the second port using data in the dedicated transmit-frame buffer.

22. The method according to claim 20, wherein the step (d)(i) further comprises receiving non-data frames to the first inbound non-data buffer from the first port, and wherein the step (d)(ii) further comprises receiving data frames to the data-frame buffer from the second port substantially simultaneous with step (d)(i).

23. The method according to claim 20, wherein the step (d)(i) further comprises receiving non-data frames to the second inbound non-data buffer from the second port, and the step (d)(ii) further comprises receiving data frames to data-frame buffer from the first port.

24. The method according to claim 16, wherein the implementing step (b) further comprises steps of:

(b)(iii) configuring the dedicated frame buffer as an on-chip buffer that includes a dedicated on-chip transmit-frame buffer, and (b)(iv) operatively coupling the on-chip transmit-frame buffer to at least one of the first and second ports; and wherein the transmitting step (c) further comprises a step of (c)(iv) transmitting loop-initialization and response frames from the on-chip transit-frame buffer.

25. The method according to claim 24, wherein the implementing step (b) further comprises a step of (b)(v) operatively coupling the dedicated transmit-frame buffer to both ports; and wherein the transmitting step (c) further comprises a step of (c)(vii) transmitting loop-initialization frames substantially simultaneously on both the first port and the second port using data in the transmit-frame buffer.

26. The method according to claim 25, wherein the transmitting step (c) further comprises a step of (c)(viii) transferring data through the serial communications channel between a data storage device that is operatively coupled to the first channel node and a computer system having a second channel node, wherein the second channel node is operatively coupled to the first channel node by the serial communications channel.

* * * * *